(12) United States Patent
Cioc

(10) Patent No.: US 11,460,078 B2
(45) Date of Patent: Oct. 4, 2022

(54) ACTIVE DOUBLE ECLUTCH MODULE

(71) Applicant: Magna Powertrain Inc., Concord (CA)

(72) Inventor: Adrian Cioc, North York (CA)

(73) Assignee: Magna Powertrain Inc., Concord (CA)

( * ) Notice: Subject to any disclaimer, the term of this patent is extended or adjusted under 35 U.S.C. 154(b) by 0 days.

(21) Appl. No.: 17/634,268

(22) PCT Filed: Nov. 11, 2020

(86) PCT No.: PCT/CA2020/051522
§ 371 (c)(1),
(2) Date: Feb. 10, 2022

(87) PCT Pub. No.: WO2021/092678
PCT Pub. Date: May 20, 2021

(65) Prior Publication Data
US 2022/0268324 A1    Aug. 25, 2022

Related U.S. Application Data

(60) Provisional application No. 63/065,005, filed on Aug. 13, 2020, provisional application No. 62/934,272, filed on Nov. 12, 2019.

(51) Int. Cl.
*F16D 27/118* (2006.01)
*F16D 27/108* (2006.01)
(Continued)

(52) U.S. Cl.
CPC ............ *F16D 27/118* (2013.01); *F16D 11/14* (2013.01); *F16D 27/108* (2013.01); *F16D 2011/008* (2013.01)

(58) Field of Classification Search
CPC .. F16D 27/118; F16D 27/12; F16D 2011/008; F16D 11/14; F16D 27/108
See application file for complete search history.

(56) References Cited

U.S. PATENT DOCUMENTS 3,327,823 A    6/1967  Miller
3,675,747 A    7/1972  Obermark
(Continued)

FOREIGN PATENT DOCUMENTS

FR      2609512 A  *  7/1988  ............. F16D 27/10
WO   2015130489 A1    9/2015
(Continued)

OTHER PUBLICATIONS

Notification of Transmittal of the International Search Report and the Written Opinion of the International Searching Authority for International Application No. PCT/CA2020/,051522 dated Jan. 13, 2021.

*Primary Examiner* — Stacey A Fluhart
(74) *Attorney, Agent, or Firm* — Warn Partners, P.C.

(57) ABSTRACT

A modular clutch assembly with two independent power sources and a connection with an output device. The two independent power sources and the output device can take many different forms. The modular clutch assembly has a housing that connects the two power sources with the output device and controls power transfer using an inner clutch and an upper clutch. There is further provided an output hub connected to the output device, where the output hub extends into the modular clutch assembly for selective rotation. The output device in one exemplary embodiment of the invention is a transmission of a vehicle.

29 Claims, 17 Drawing Sheets

(51) Int. Cl.
*F16D 11/14* (2006.01)
*F16D 11/00* (2006.01)

(56) References Cited

U.S. PATENT DOCUMENTS

| | | |
|---|---|---|
| 9,284,995 B2 | 3/2016 | Lawson et al. |
| 2017/0267246 A1* | 9/2017 | Hashimoto ............. F16D 7/044 |
| 2020/0371590 A1* | 11/2020 | Remaley ................ B25J 9/0006 |

FOREIGN PATENT DOCUMENTS

| | | | | |
|---|---|---|---|---|
| WO | WO-2018072946 A1 * | 4/2018 | | .............. F16D 11/14 |
| WO | 2019134053 A1 | 7/2019 | | |

* cited by examiner

ACTIVE DOUBLE ECLUTCH MODULE

CROSS-REFERENCE TO RELATED APPLICATIONS

This application claims the benefit of U.S. Provisional Patent Application No. 62/934,272, filed Nov. 12, 2019 and U.S. Provisional Patent Application No. 63/065,005, filed Aug. 13, 2020. The disclosures of the above applications are incorporated herein by reference.

FIELD OF THE INVENTION

The present invention relates to a two coil modular clutch assembly for possible use with vehicles having multiple power sources or requiring enhanced torque transfer features.

BACKGROUND OF THE INVENTION

In the automotive industry today there has been a push to increase fuel economy resulting in a number of different engine systems being developed along with improvements to the vehicle transmission. In particular traditional internal combustion engines have been replaced with hybrid systems that combine a combustion engine power source and an electric power source. These hybrid systems create a need to provide a transmission that is able to seamlessly use inputs from multiple power sources. Additionally, there is a need to provide clutch systems that have improved torque transfer within a restricted transmission space. This is particularly required as transmission input power is increased.

SUMMARY OF THE INVENTION

The present invention is directed to a modular clutch assembly with two independent power sources and a connection with an output device. The two independent power sources and the output device can take many different forms, and the invention is not limited to a specific power source or output device. The modular clutch assembly has a housing that connects with the output device. There is further provided an output hub connected to the output device, where the output hub extends into the modular clutch assembly for selective rotation. The output device in one exemplary embodiment of the invention is a transmission of a vehicle.

The modular clutch assembly further includes an inner clutch race connected to a first power source, the inner clutch race rotatably extends into the modular clutch assembly. The first power source in one exemplary embodiment is an internal combustion engine. There is further provided an inner clutch that is selectively connectable to the inner clutch race. The inner clutch includes an inner coil positioned within the modular clutch assembly. The inner coil includes an inner coil winding contained in a housing and a cover that together form a fixed part of the inner coil. The cover has an inside surface and the housing has an inner diameter surface that define a passage that an armature slidably moves within upon energization and de-energization of the inner coil. The armature has a non-magnetic portion of the armature that is supported at one end by a wall on the cover and at a second end by an extension that contacts and slides on the inner diameter surface of the housing. The armature further includes a magnetic portion that is moveably positioned within the passage at a gap distance from the inner diameter surface of the housing. The gap distance is provided by the extension of the non-magnetic portion of the armature extending past an outer diameter surface of the magnetic portion of the armature. The cover and the housing also each have a stop surface at each end of the passage that prevents the armature from sliding out of the passage.

The armature moves in a first direction when the inner coil is energized, and the armature moves in a second direction when the inner coil is de-energized. The inner clutch also has an inner clutch dog plate rotatably positioned between the inner clutch race, the output hub, and the armature. The inner clutch dog plate is axially movable in the first direction when the armature transmits axial force to the inner clutch dog plate, thereby causing the inner clutch dog plate to engage both the inner clutch race and the output hub so that the torque from the inner clutch race is selectively transferred to the output hub.

The modular clutch assembly also has an upper clutch race connected to a second power source, the upper clutch race rotatably extends into the modular clutch assembly. The second power source in one exemplary embodiment is an electric motor. The upper clutch circumscribes the inner clutch and is selectively connectable to the upper clutch race. The upper clutch includes an upper coil with an upper coil winding contained in a housing and a cover that together form a fixed part of the upper coil. The cover has an inside surface and the housing has an inner diameter surface that define a passage that an armature slidably moves within upon energization and de-energization of the upper coil. The armature has a non-magnetic portion of the armature that is supported at one end by a wall on the cover and at a second end by an extension that contacts and slides on the inner diameter surface of the housing. The armature further includes a magnetic portion that is moveably positioned within the passage at a gap distance from the inner diameter surface of the housing. The gap distance is provided by the extension of the non-magnetic portion of the armature extending past an outer diameter surface of the magnetic portion of the armature. The cover and the housing also each have a stop surface at each end of the passage that prevents the armature from sliding out of the passage. The armature moves in the first direction when the upper coil is de-energized and the armature moves in the second direction when the upper coil is energized. The upper clutch also further includes an upper clutch dog plate rotatably positioned between the upper clutch race, the output hub, and the armature, when the upper coil is de-energized. The armature and the upper clutch dog plate move in a second direction, thereby cause the upper clutch dog plate to engage both the upper clutch race and the output hub so that the torque from the upper clutch race is selectively transferred to the output hub.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

Throughout this application the terms "power", "energy", "force" or "force" are all used interchangeably and refer to torque and the resulting flow path of force through the various modular clutch assemblies described below.

Figure 27:
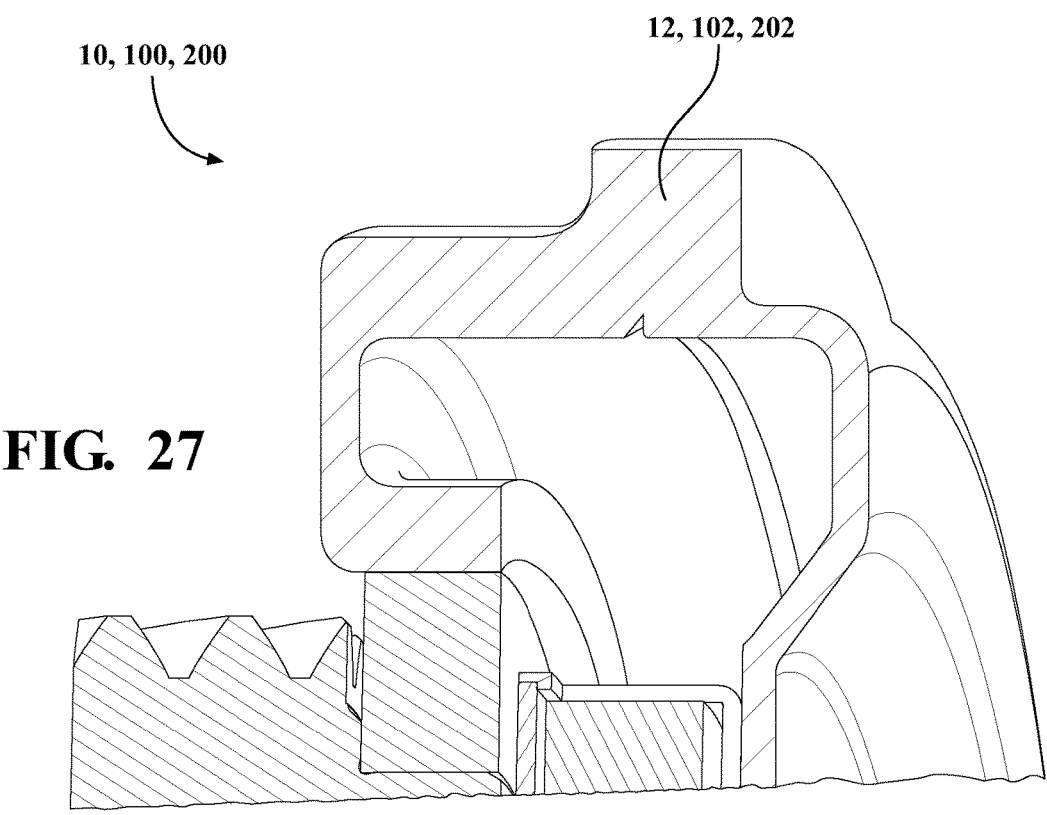
FIG. 27 is a partial cross-sectional view of a housing with a modular clutch assembly according to all of the embodiments of the invention connected to the housing.
Figure 28:
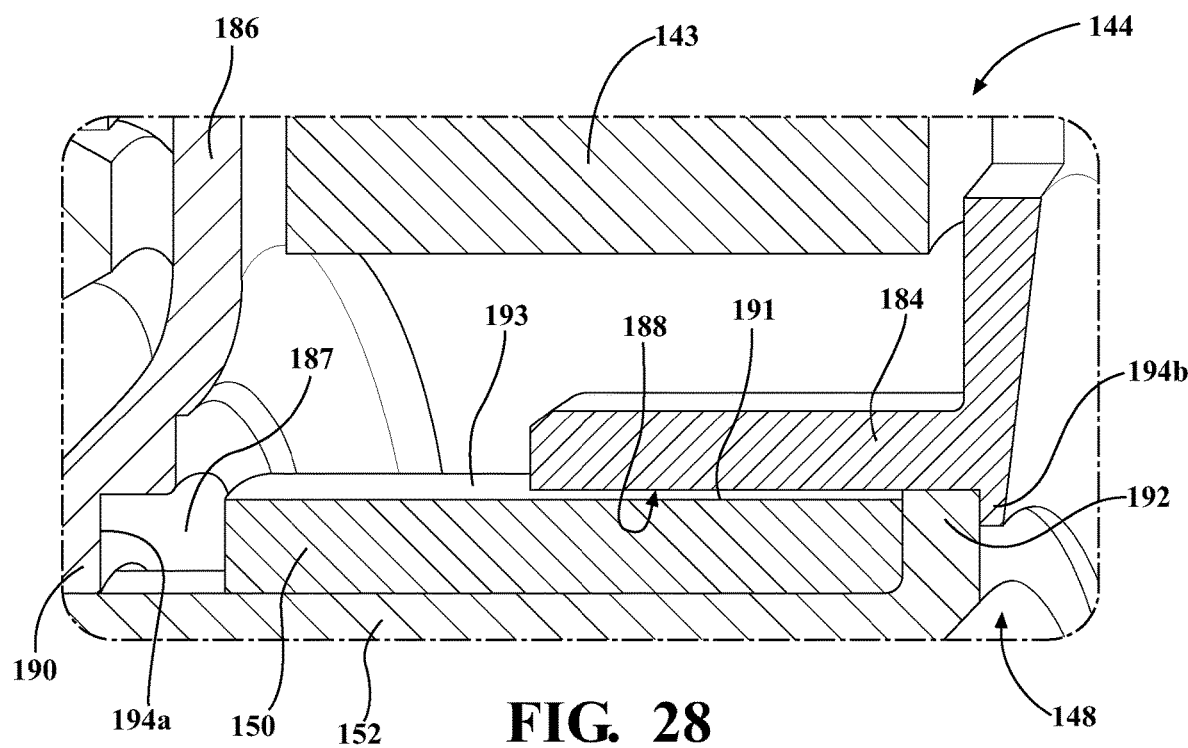
FIG. 28 is an enlarged view of a portion of the upper coil of FIG. 16.
Figure 29:
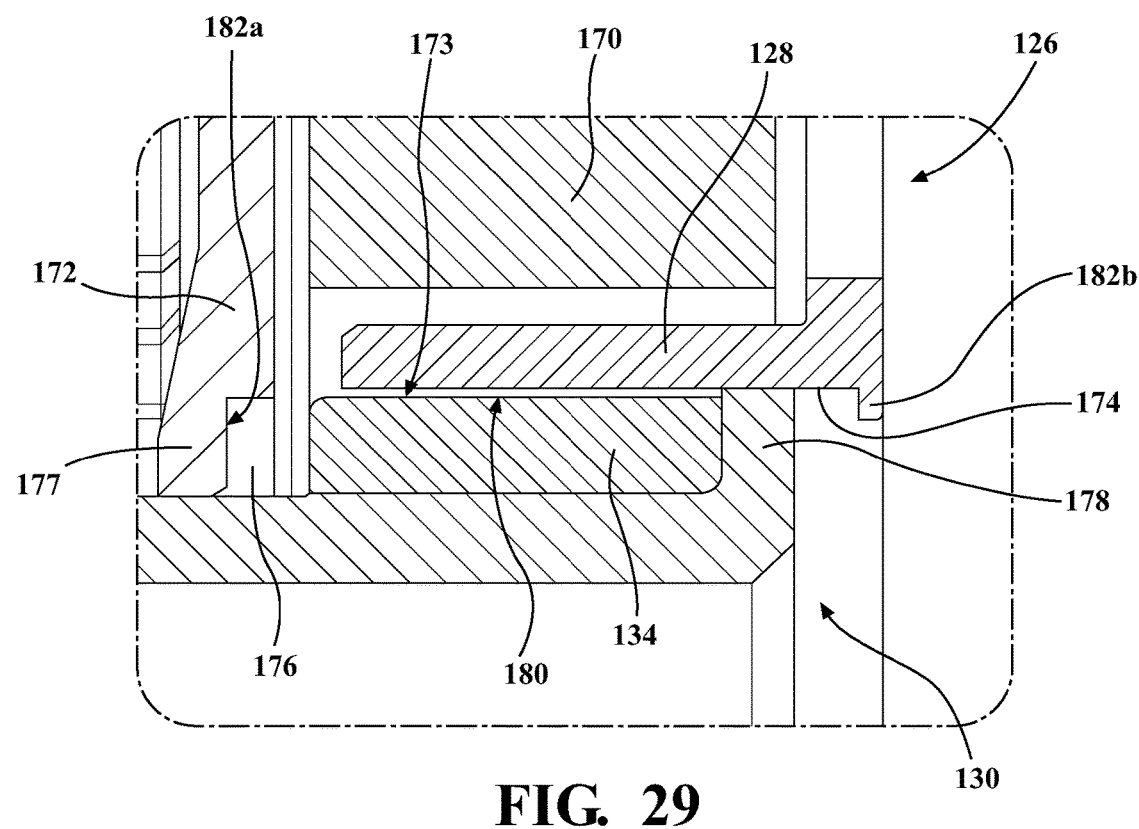
FIG. 29 is an enlarged view of a portion of the inner coil of FIG. 15.
Figure 30:
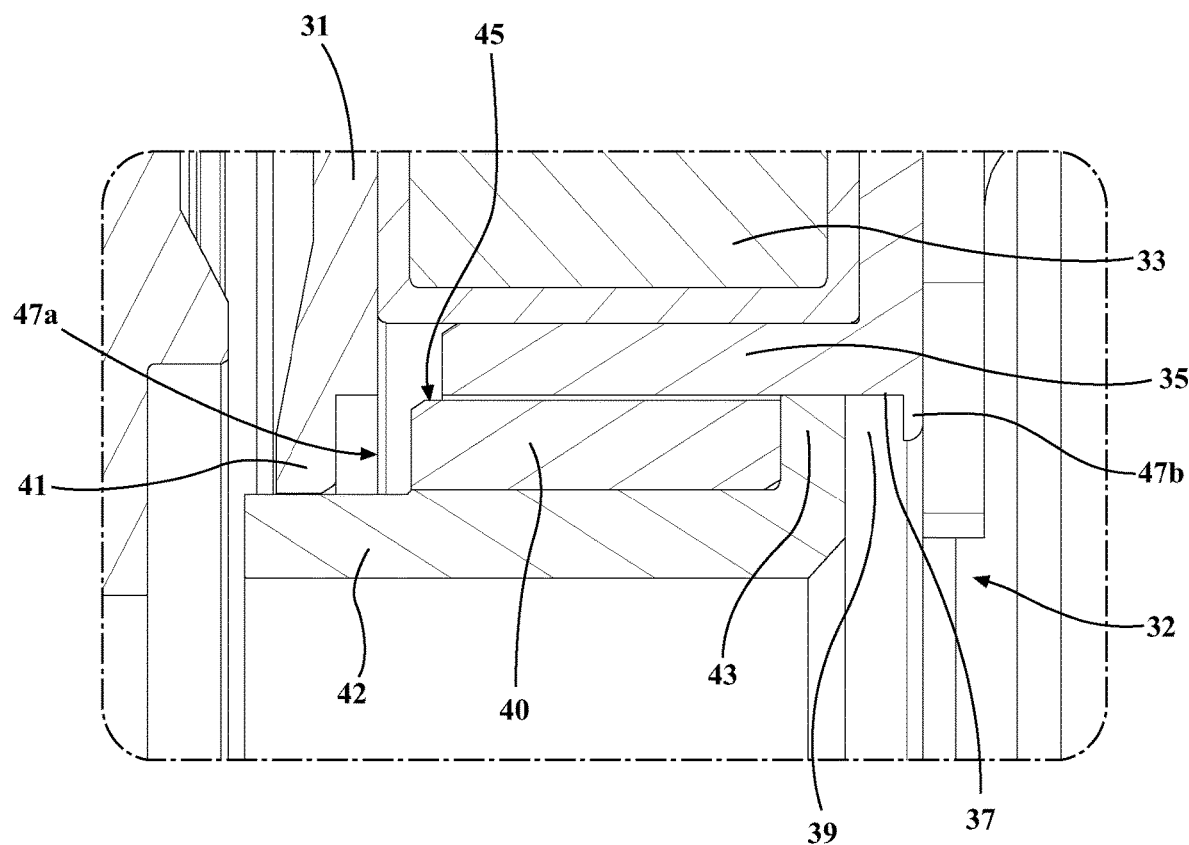
FIG. 30 is an enlarged view of a portion of the inner coil of FIG. 1.

Referring now to FIGS. 1-13 and 27 a modular clutch assembly 10 according to a first embodiment of the invention is provided. The modular clutch assembly 10 includes a housing 12 (shown in FIG. 27), which can be a single piece or multiple pieces. The housing 12 is connected to or part of a housing of a transmission. The modular clutch assembly 10 includes an output hub 14 extending into the modular clutch assembly 10 for selective rotation. The output hub 14 is the output of the modular clutch assembly 10, which ultimately provides power to and output device 13, which can be the transmission or other suitable device, whether it be through a direct connection, gear train or other configuration. In this particular embodiment of the invention, one side of the output hub 14 has a plurality of inner clutch face lugs 16, which are circumscribed by a plurality of upper clutch face lugs 18, the purpose of which will be described later.

Rotatably extending into the modular clutch assembly 10 is an inner clutch race 20, which is one source of input power into the modular clutch assembly 10. The inner clutch race 20 can be connected to a power source 21 shown generally. The power source 21 more specifically can be an internal combustion engine, electric motor, or other power source. The inner clutch race 20 has a plurality of face teeth 22 that rotate within the modular clutch assembly 10. The inner clutch race 20 also has splines 24 that are connected to another rotatable shaft (not shown) that connects the power source 21, however, this is optional and in some embodiments of the invention there can be a direct connection with the power source 21.

Figure 14:
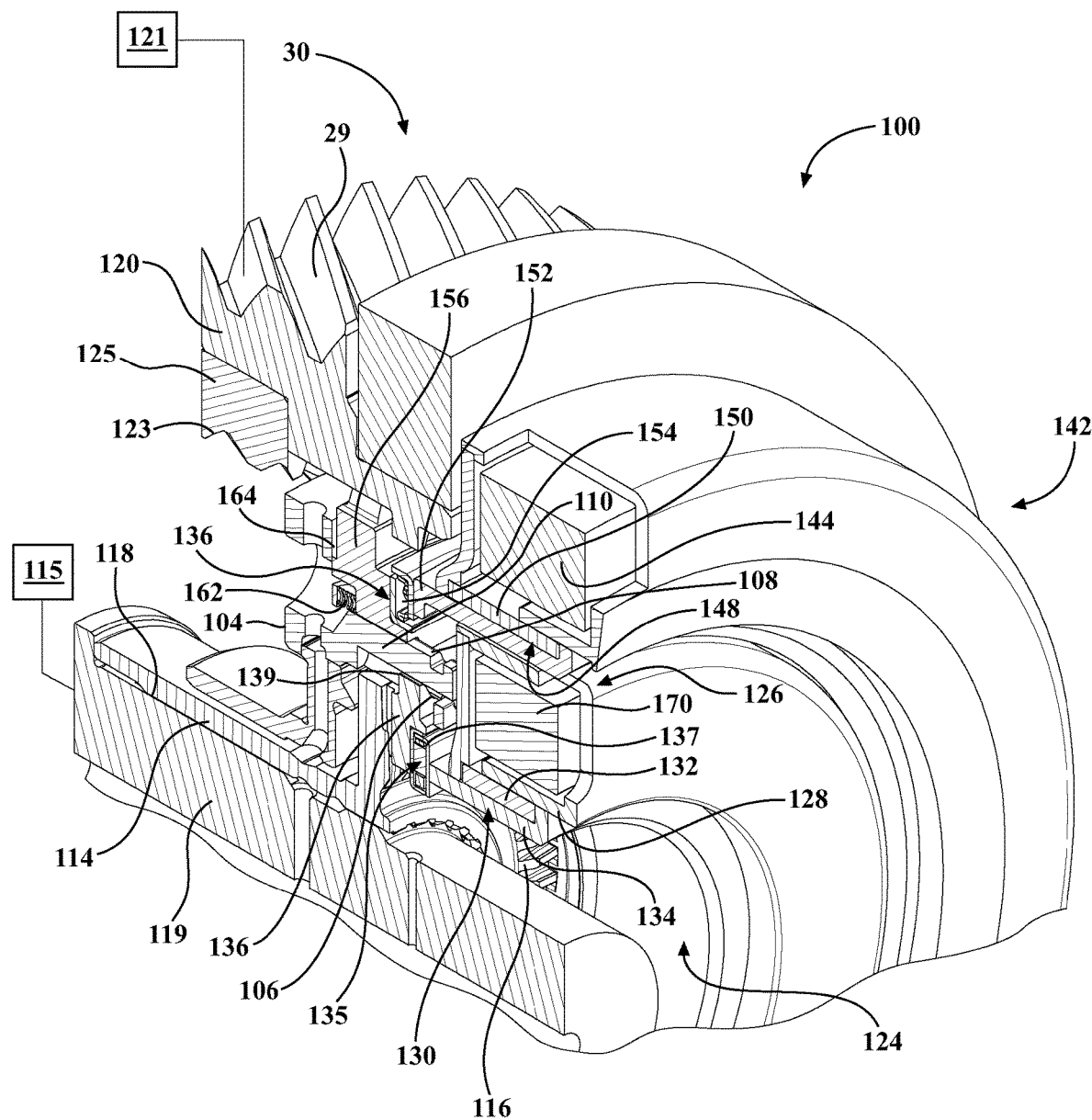
FIG. 14 is a partial side sectional perspective view of a modular clutch assembly according to a second embodiment of the invention that implements a face clutch and single tooth radial clutch.

Rotatably extending into the modular clutch assembly 10 is an upper clutch race 26, which is a second source of input power into the modular clutch assembly 10. The upper clutch race 26 can be connected to a power source 27 shown generally. The power source 27 more specifically can be an internal combustion engine, electric motor, or other power source. The upper clutch race 26 has a plurality of face teeth 28 on one side of the upper clutch race 26 that rotate within the modular clutch assembly 10. The upper clutch race 26 (shown in FIG. 14) also optionally has splines 29 on the outer diameter surface 30 that connect to the power source; however, this is optional and in some embodiments of the invention there can be a direct connection with the power source 27.

The modular clutch assembly 10 further includes an inner clutch 32 having an inner coil 34 capable of creating a magnetic field that causes movement of an armature 38. The inner coil 34 includes an inner coil winding 33 wound about a housing 35 and a cover 31 that together form a fixed part of the inner coil 34. The cover 31 has an inside surface and the housing 35 has an inner diameter surface 37 that define a passage 39 that the armature 38 slidably moves within upon energization and de-energization of the inner coil 34. The armature 38 has a non-magnetic portion 42 of the armature 38 that is supported at one end by a wall 41 on the cover 31 and at a second end by an extension 43 of the non-magnetic portion 42 of the armature 38 that contacts and slides on the inner diameter surface 37 of the housing 35. The armature 38 further includes a magnetic portion 40 that is moveably positioned within the passage 39 at a gap distance from the inner diameter surface 37 of the housing 35. The gap distance is provided by the extension 43 of the non-magnetic portion 42 of the armature 38 extending past an outer diameter surface 45 of the magnetic portion 40 of the armature 38. The cover 31 and the housing 35 also each have a stop 47a, 47b surface at each end of the passage 39 that prevents the armature 38 from sliding out of the passage 39. The non-magnetic portion 42 of the armature 38 is configured to directly contact an axial bearing 44, position between the end of the armature 38 and an inner clutch dog plate 46, which is described in greater detail below. The armature 38 is formed of two materials including a magnetic material portion and a non-magnetic material portion. In one embodiment the non-magnetic material portion is non-magnetic stainless steel, however, it is within the scope of the invention for other materials to be used.

Figure 1:
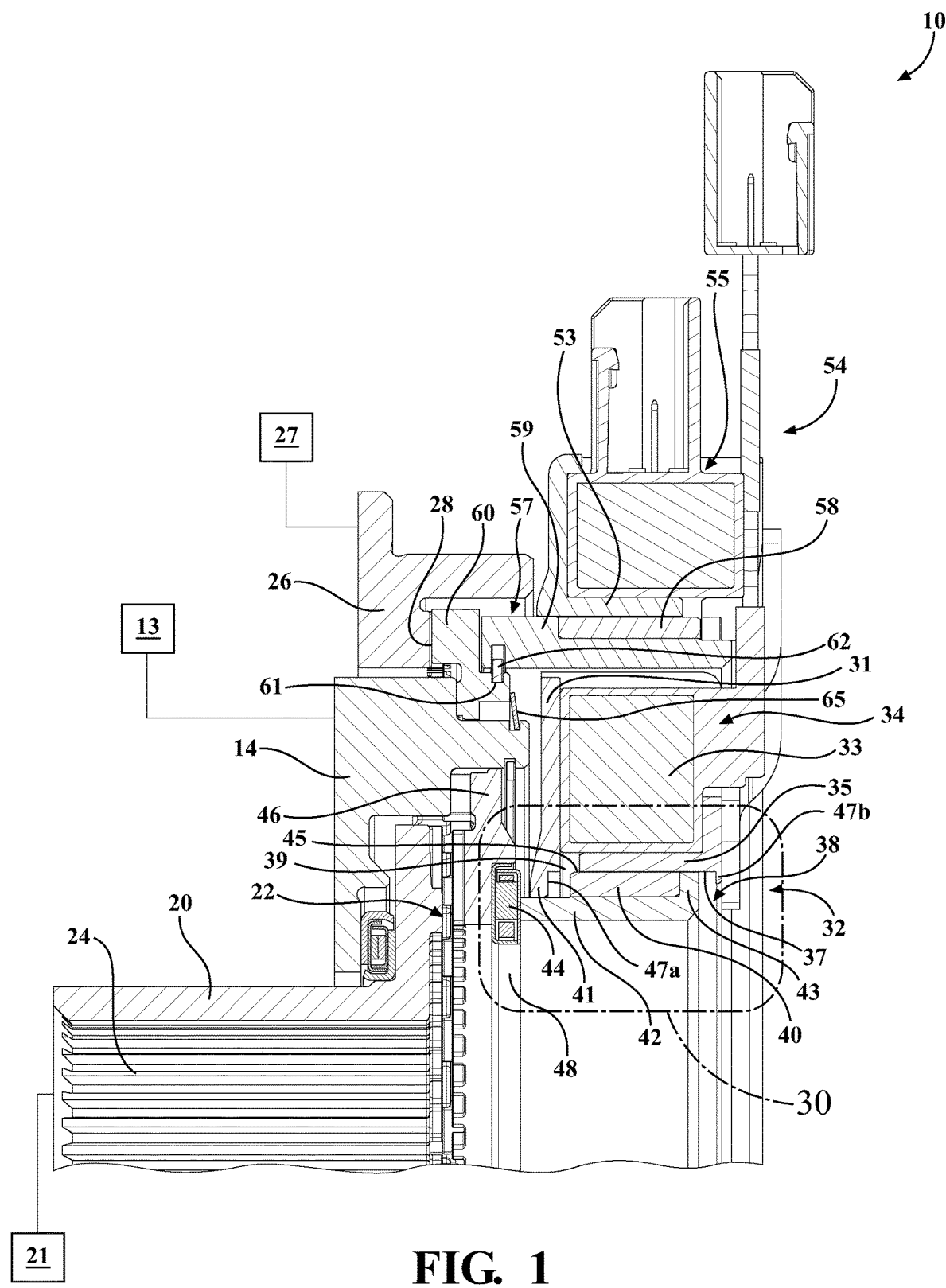
FIG. 1 is a partial side cross-sectional plan view of a modular clutch assembly according to a first embodiment of the invention that implements a dual face dog clutch.
Figure 2:
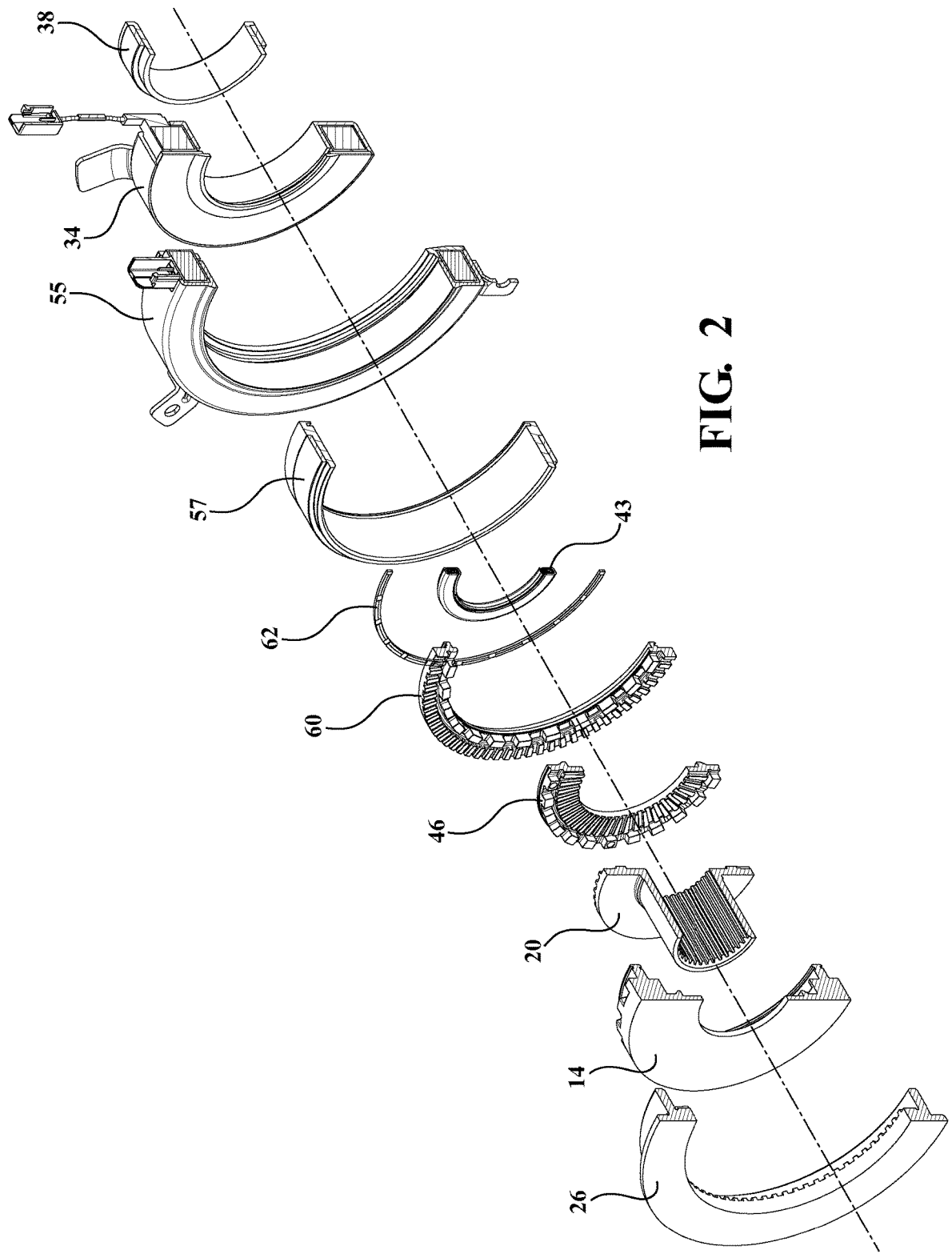
FIG. 2 is an exploded side perspective view of the modular clutch assembly of the first embodiment of the invention.
Figure 13:
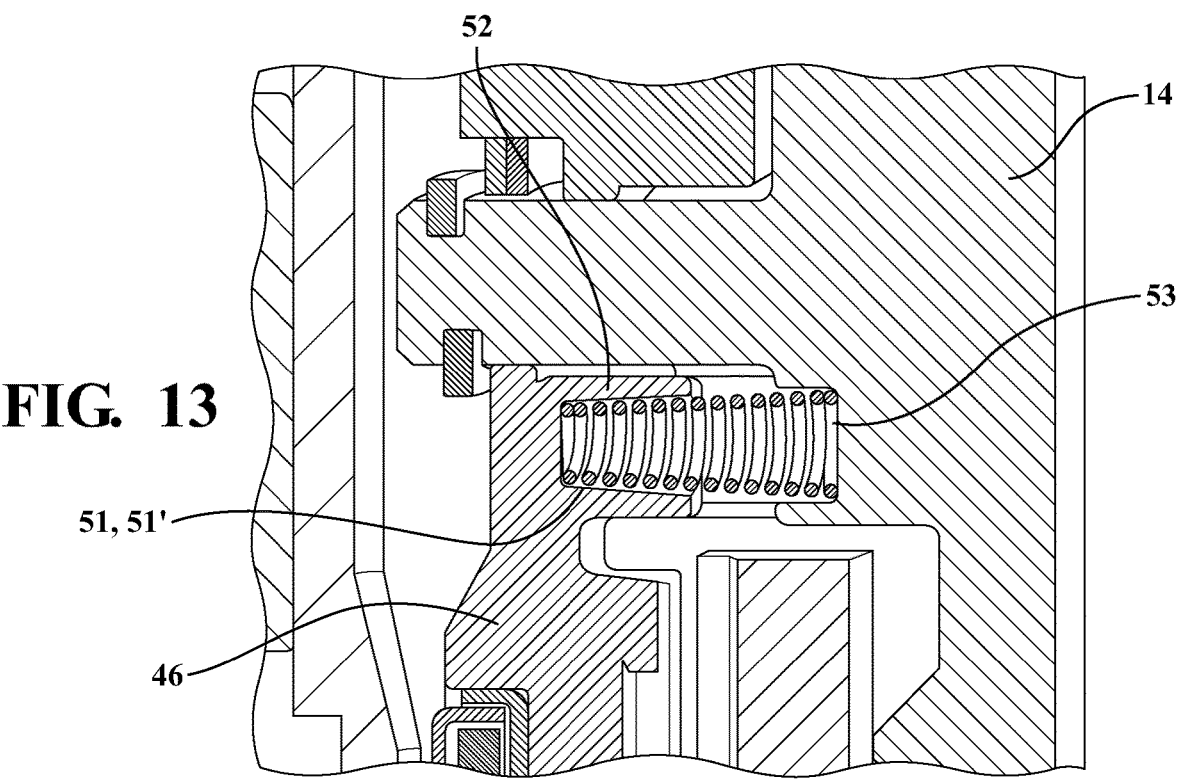
FIG. 13 is an enlarged partial plan side view of the one of the springs positioned between the inner clutch dog plate and the output hub of the modular clutch assembly of the first embodiment of the invention.

The armature 38 moves in a first direction (to the left as shown in FIG. 1) when the inner coil 34 is energized and the armature 38 moves in a second direction (to the right as shown in FIG. 1) when the inner coil 34 is de-energized. The inner clutch dog plate 46 is rotatably positioned between the inner clutch race 20, the output hub 14 and the armature 38. In the present embodiment of the invention the inner clutch dog plate 46 on a first side has a radial bearing pocket 48 formed for receiving the axial bearing 44 that is positioned between the inner clutch dog plate 46 and the armature 38. The axial bearing 44 reduces the friction between the rotating inner clutch dog plate 46 and the armature 38, which is stationary. During operation, the armature 38 pushes against the axial bearing 44, which in turn contacts and pushes against the inner clutch dog plate 46. On the other side of the inner clutch dog plate 46 there are two types of teeth. Referring to FIG. 13, one portion of the second side of the inner clutch dog plate 46 has a plurality of dog teeth 50 that are face teeth selectively engageable the plurality of face teeth 22 formed on the inner clutch race 20. Positioned radially around the plurality of dog teeth 50 on the inner clutch dog plate 46 are a plurality of face lug teeth 52 that are engageable with the plurality of inner clutch face lugs 16 formed on the output hub 14.

Figure 5:
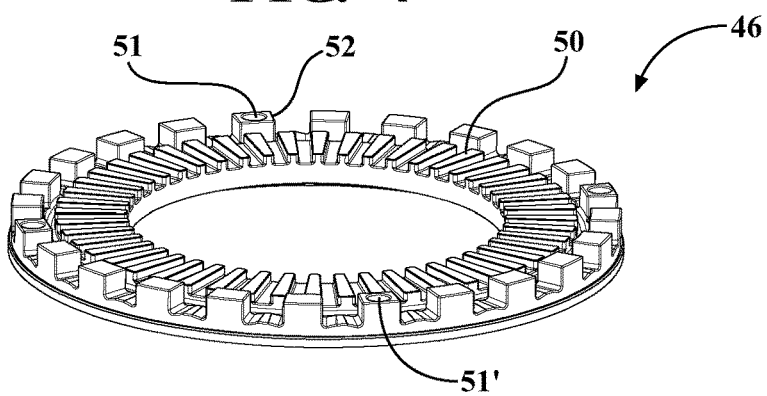
FIG. 5 is a first side perspective view of an inner clutch dog plate used in the modular clutch assembly of the first embodiment of the invention.
Figure 6:
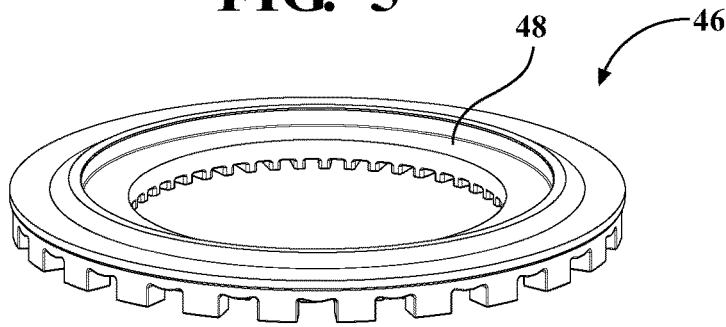
FIG. 6 is a second side perspective view of an inner clutch dog plate used in the modular clutch assembly of the first embodiment of the invention.
Figure 7:
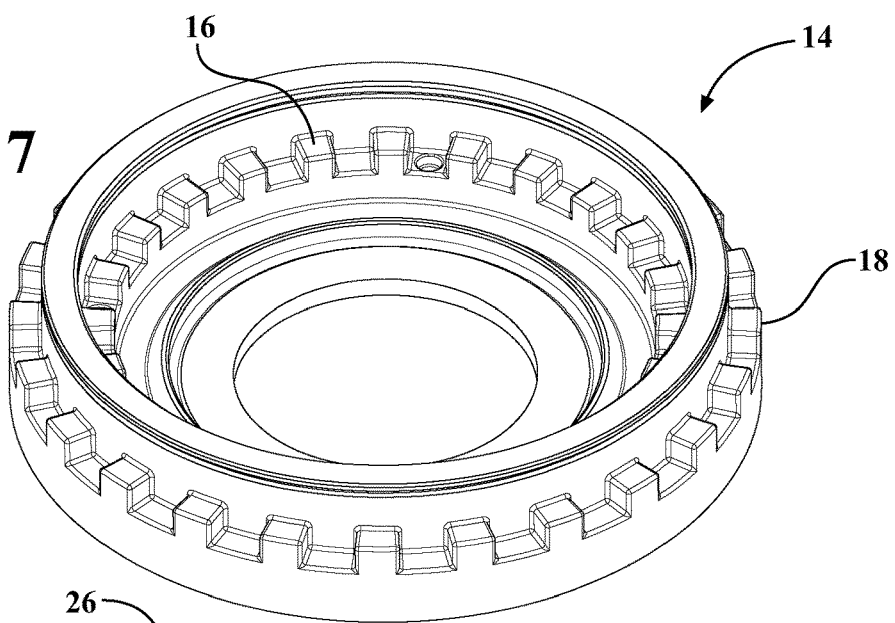
FIG. 7 is a first side perspective view of an output hub used in the modular clutch assembly of the first embodiment of the invention.
Figure 8:
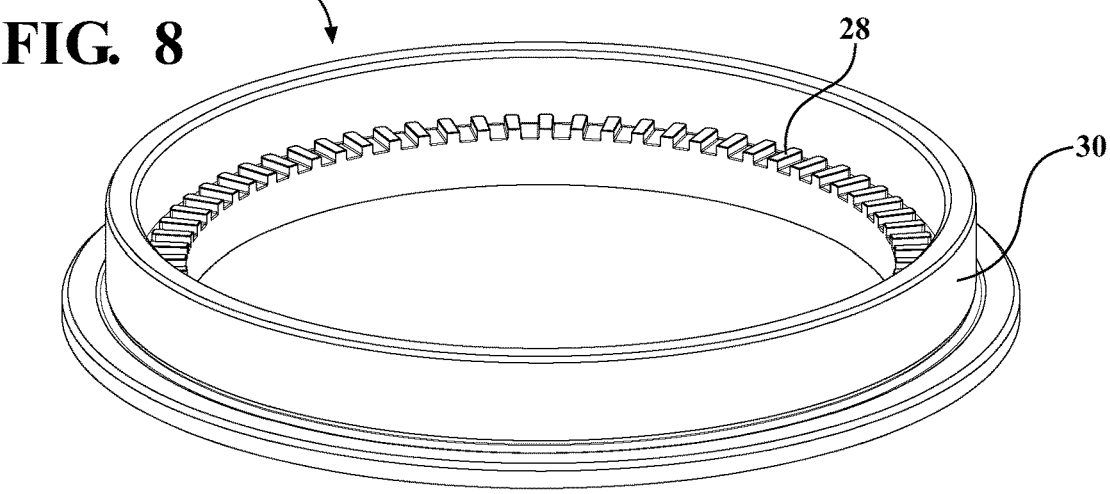
FIG. 8 is a first side perspective view of an upper clutch race used in the modular clutch assembly of the first embodiment of the invention.
Figure 11:
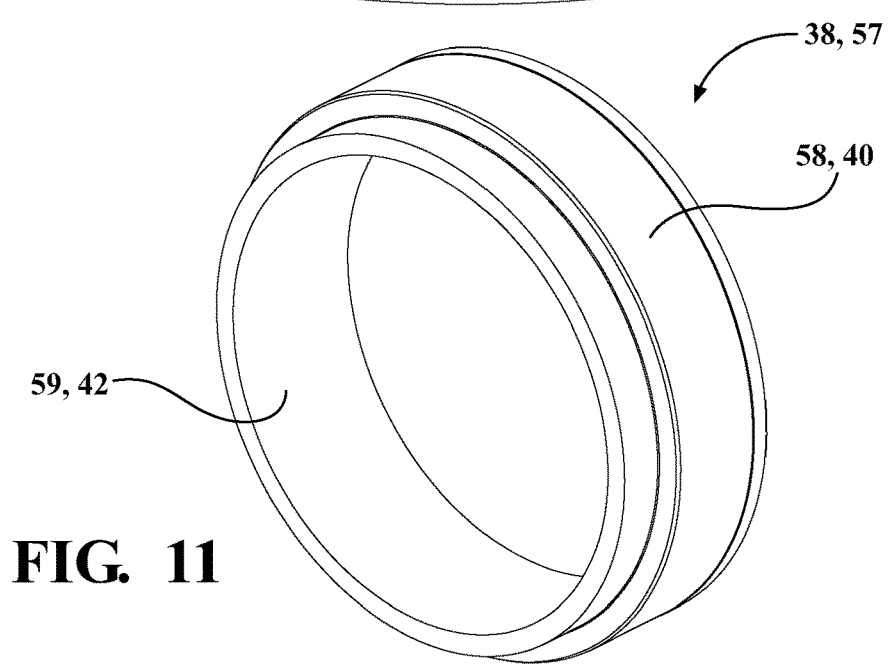
FIG. 11 is a first side perspective view of an armature used in with either the inside clutch or outside clutch of the modular clutch assembly of the first embodiment of the invention.
Figure 10:
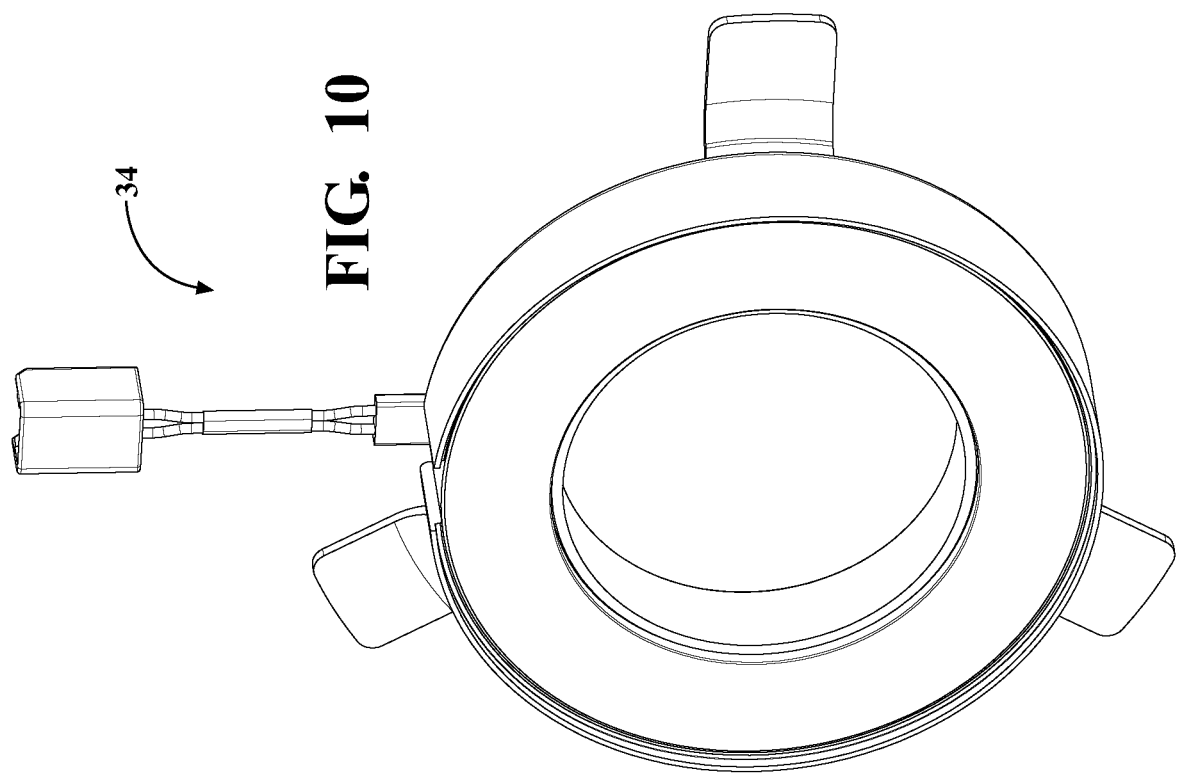
FIG. 10 is a second side perspective view of a portion of the assembled modular clutch assembly of the first embodiment of the invention.
Figure 9:
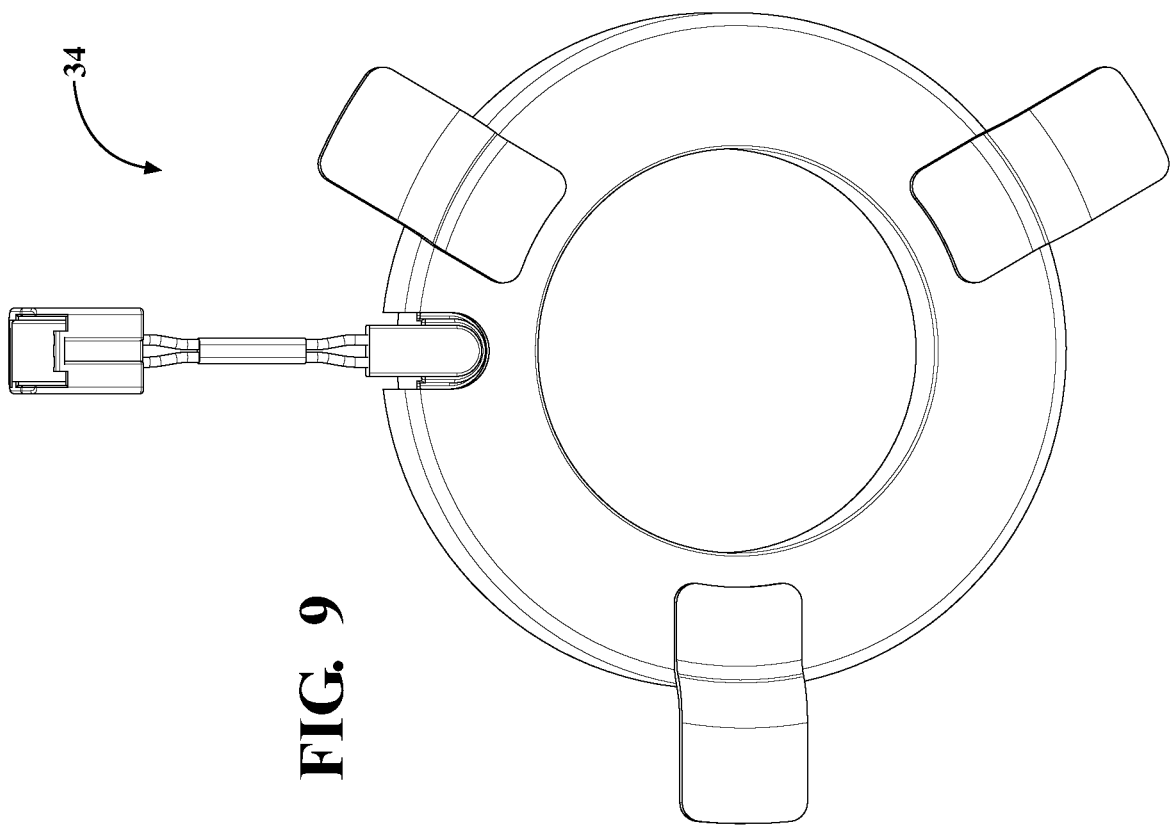
FIG. 9 is a first side perspective view of a portion of the assembled modular clutch assembly of the first embodiment of the invention.
Figure 12:
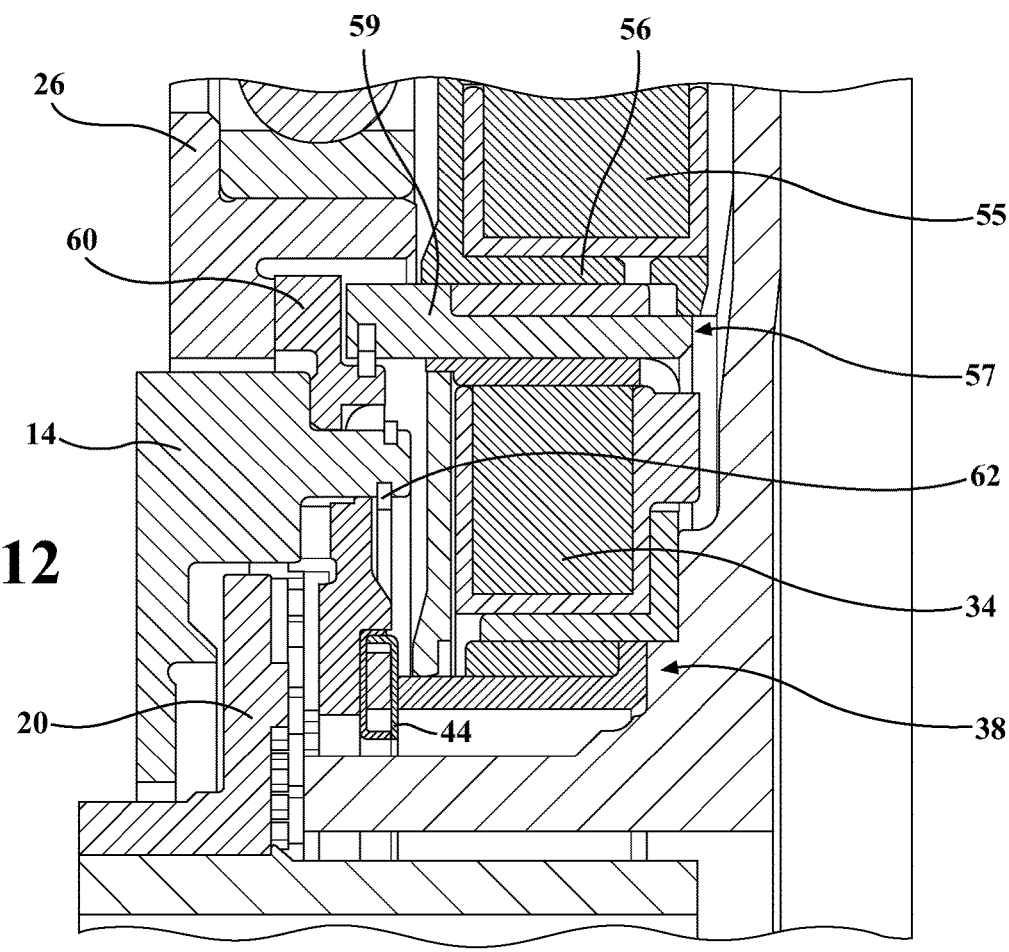
FIG. 12 is an enlarged partial plan side view of the inner clutch and upper clutch armatures of the modular clutch assembly of the first embodiment of the invention.

The inner clutch dog plate 46 is axially movable in the first direction (to the left shown in FIG. 1) when the armature 38 contacts and applies axial force to the axial bearing 44, which is transmitted to the inner clutch dog plate 46, thereby causing the inner clutch dog plate 46 to engage both the inner clutch race 20 and the output hub 14. In this position torque from the inner clutch race 20 is transferred to the output hub 14. Referring to FIGS. 5 and 13, at least two of the plurality of face lug teeth 52 of the inner clutch dog plate 46 is a pocket 51, 51' that holds a coil spring 53. When the armature 38 is moved in the first direction (to the left as shown in FIG. 1) by energization of the inner coil 34, the inner clutch dog plate 46 compressed the coil spring 53. When the inner coil 34 is de-energized the coil spring 53 pushes the inner clutch dog plate 46 in the opposite direction (to the right shown in FIG. 1), thereby disengaging the inner clutch dog plate 46 from the output 14 and the inner clutch race 20.

Referring now to FIGS. 1-13, the modular clutch assembly 10 further includes an upper clutch 54 circumscribing the inner clutch 32. An upper coil 55 capable of creating a magnetic field that causes movement of an armature 57. The upper coil 57 is positioned within the modular clutch assembly 10 and includes an upper coil winding 56 contained in a housing 53 that forms a fixed part of the upper coil 55. The armature 57 has a magnetic portion 58 positioned partially within the housing 53. The armature 57 also has a non-magnetic portion 59 that extends outside of the housing 53 and contacts an upper clutch dog plate 60, the purpose of which will be described later. The armature 57 moves in the first direction (to the left in FIG. 1) when the upper coil 55 is de-energized and the armature 57 moves in the second direction (to the right shown in FIG. 1) when the upper coil 55 is energized. The armature 57 is configured to slide on the outside housing of the inner coil 34 of the inner clutch 32. One of the unique features of the present embodiment of the invention is that the inner clutch 32 and the upper clutch 54 operate by moving in opposite directions when the respective inner coil 34 and upper coil 55 are energized and de-energized.

Figure 3:
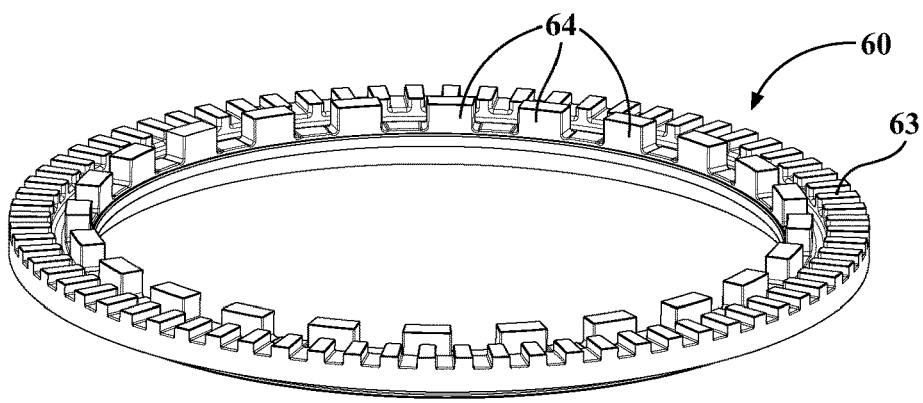
FIG. 3 is a first side perspective view of an upper clutch dog plate used in the modular clutch assembly of the first embodiment of the invention.
Figure 4:
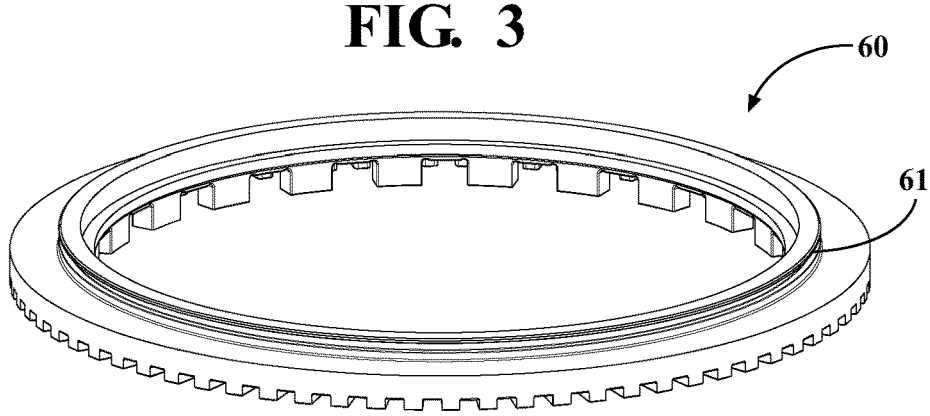
FIG. 4 is a second side perspective view of an upper clutch dog plate used in the modular clutch assembly of the first embodiment of the invention.

The upper clutch 54 further includes the upper clutch dog plate 60 rotatably positioned between the upper clutch race 26, the output hub 14 and the armature 57. Referring specifically to FIGS. 3 and 4 the details of the upper clutch dog plate 60 are shown. The upper clutch dog 60 on a first side has a clip groove 61 that is configured to receive a snap ring 62 that is connected to the nonmagnetic portion 59 of the armature 57 (shown in FIG. 1). The movement of the armature 57 in the first direction and the second direction pushes and pulls the upper clutch dog plate 60 by way of the snap ring 62 connection with the clip groove 61 of the upper clutch dog plate 60. This simple, space saving connection formed by the snap ring 62 and clip groove 61 links the upper clutch dog plate 60 and armature 57 for axial movement but allows rotational movement as needed when upper clutch dog plate 60 is engaged as further described. A second side of the upper clutch dog plate 60 includes an outer set of a plurality of dog teeth 63 that are engageable with the plurality of face teeth 26 on the upper clutch race 26. Also, the second side of the upper clutch dog plate 60 includes a plurality of face lug teeth 64 that are engageable with the plurality of upper clutch face lugs 18 formed on the output hub 14.

When the upper coil 55 is de-energized the armature 57 moves in the second direction because of force supplied by a wave spring 65 positioned between the upper clutch dog plate 60 and the inner clutch race 14. The wave spring 65 becomes compressed with the armature 57 moves in the first direction in response to the upper coil 55 being energized. The movement of the armature 57 in the second direction causes the upper clutch dog plate 57 to engage both the upper clutch race 26 and the output hub 14 so that the torque from the upper clutch race 26 is transferred to the output hub 14. While the wave spring 65 is shown to be positioned between the upper clutch dog plate 60 and the inner clutch race 14 it is within the scope of the invention for the wave spring 65 to be connected to the modular clutch assembly 10 and not necessarily the inner clutch race 14.

The embodiment described above explains that the output device 13 is connected to the output hub 14, power source 21 is connected to inner clutch race 20 and power source 27 is connected to upper clutch race 26. It is within the scope of this invention for different types of connections to be used depending on a particular application. For example the output device 13 could also instead be connected to either the inner clutch race 20 or upper clutch race 26, while the power source 21 could also instead be connected to either the output hub 14 or the upper clutch race 26, and the power source 27 could also instead be connected to the output hub 14 or the inner clutch race 20. Such configurations would allow for different advantages to be achieved depending on a particular application. Therefore, the present application is not limited necessarily to the configuration described above since the modular clutch assembly 10 can be used in a variety of applications.

In addition to changing the connections between the output device 13, power source 21, and power source 27 it is also within the scope of this invention to use the inner clutch 32 and upper clutch 54 in a manner that they can change the power flow through the modular clutch assembly 10. For example, the inner clutch 32 and upper clutch 54 could simultaneously be engaged to transmit power from power source 27 or output device 13 to power source 21. In such an arrangement the upper clutch 54 and inner clutch 32 would both be engaged with the output hub 14, which would be receiving power either from the output device 13 or from the power source 27, through the inner clutch 32. This flow path of power for example could be used in systems where an internal combustion engine is the power source 21 with start/stop technology. The power source 27 would be an electric motor power source used to provide the initial "starting crank" to the internal combustion engine so it can start back up after stopping for a period of time.

It is also possible to engage both the inner clutch 32 and the upper clutch 54 to provide force from the power source 21 to the power source 27 in the opposite direction.

In such an embodiment the power source 21 would be operating and supplying power to the modular clutch assembly 10, which could be used in applications where regeneration energy to the power source 27 is desired. An example of such a system would involve the power source 21 being a running internal combustion engine, where the extra energy not being transmitted to the output device 13 is then being passed along to the power source 27, which could be an electric motor using batteries that could benefit from regenerative power capture. In addition to both scenarios described above any extra power from the output hub 14 could also be passed along to either power source 21 or power source 27 for any suitable purpose. An example would be if output device is a transmission of a vehicle that is coasting, which is then creating energy at output hub 14 that could be recaptured and used by power source 21 or power source 27.

Figure 19:
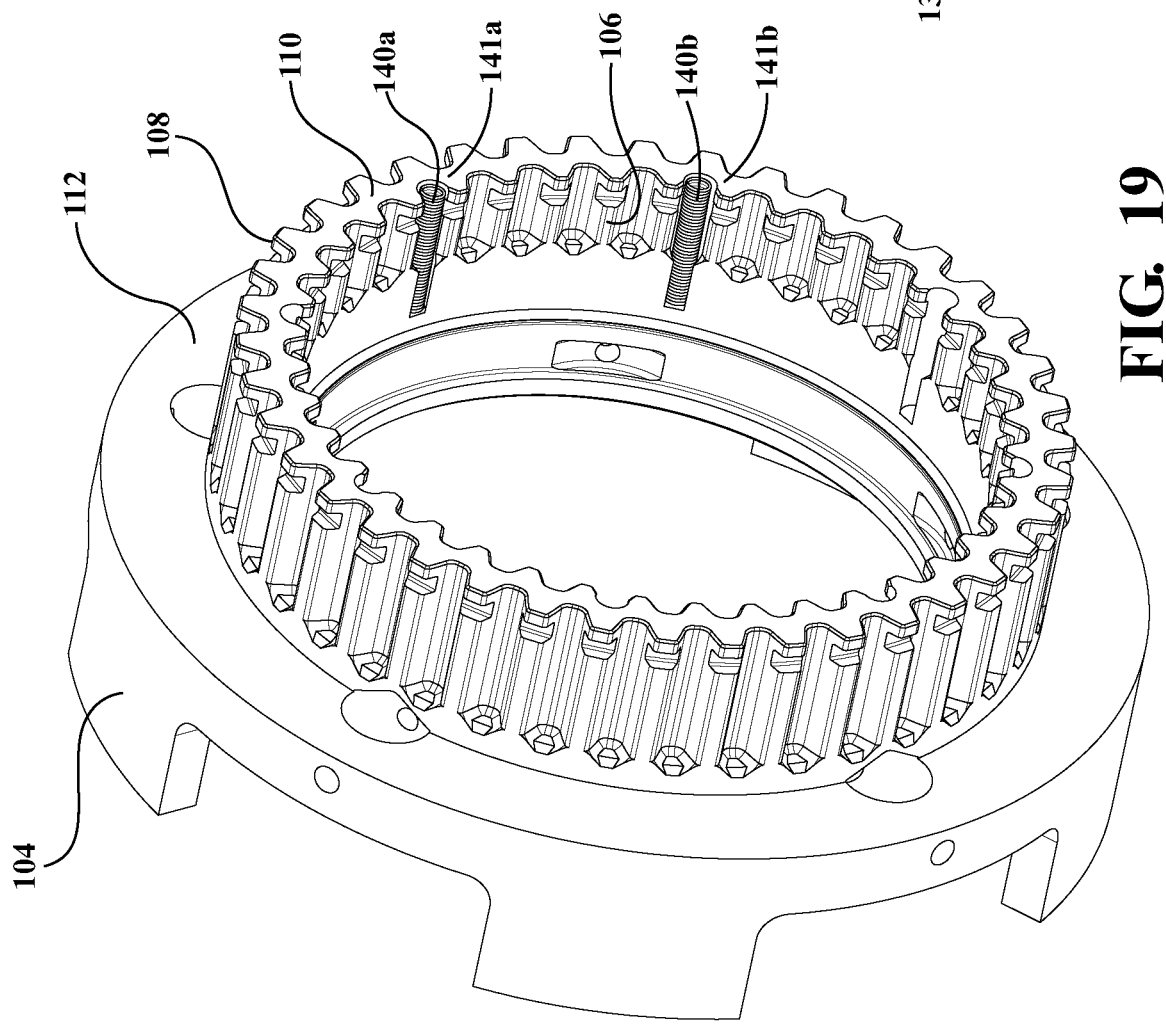
FIG. 19 is a side perspective view of an output hub of the modular clutch assembly of the second embodiment of the invention.
Figure 22:
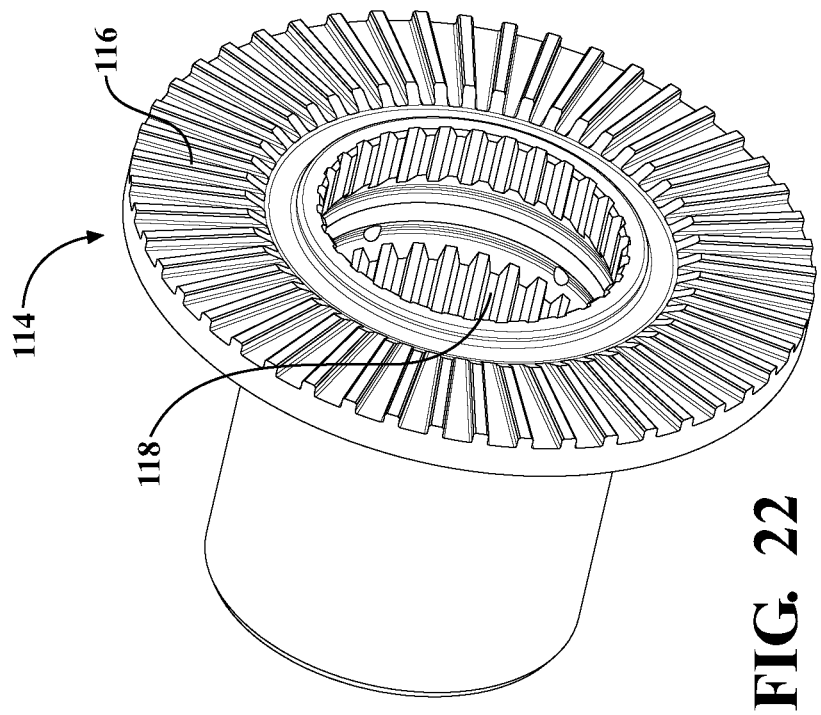
FIG. 22 is a side perspective view of an inner clutch race of the modular clutch assembly of the second embodiment of the invention.
Figure 21:
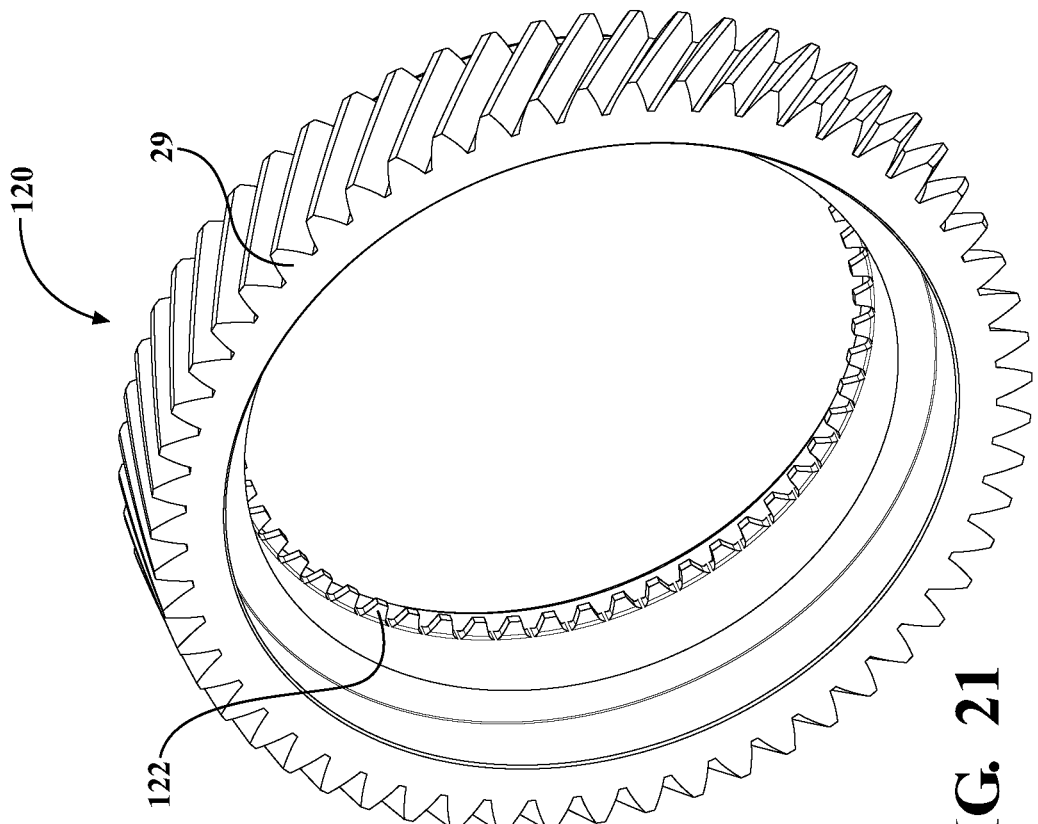
FIG. 21 is a side perspective view of an upper clutch race of the modular clutch assembly of the second embodiment of the invention.
Figure 23:
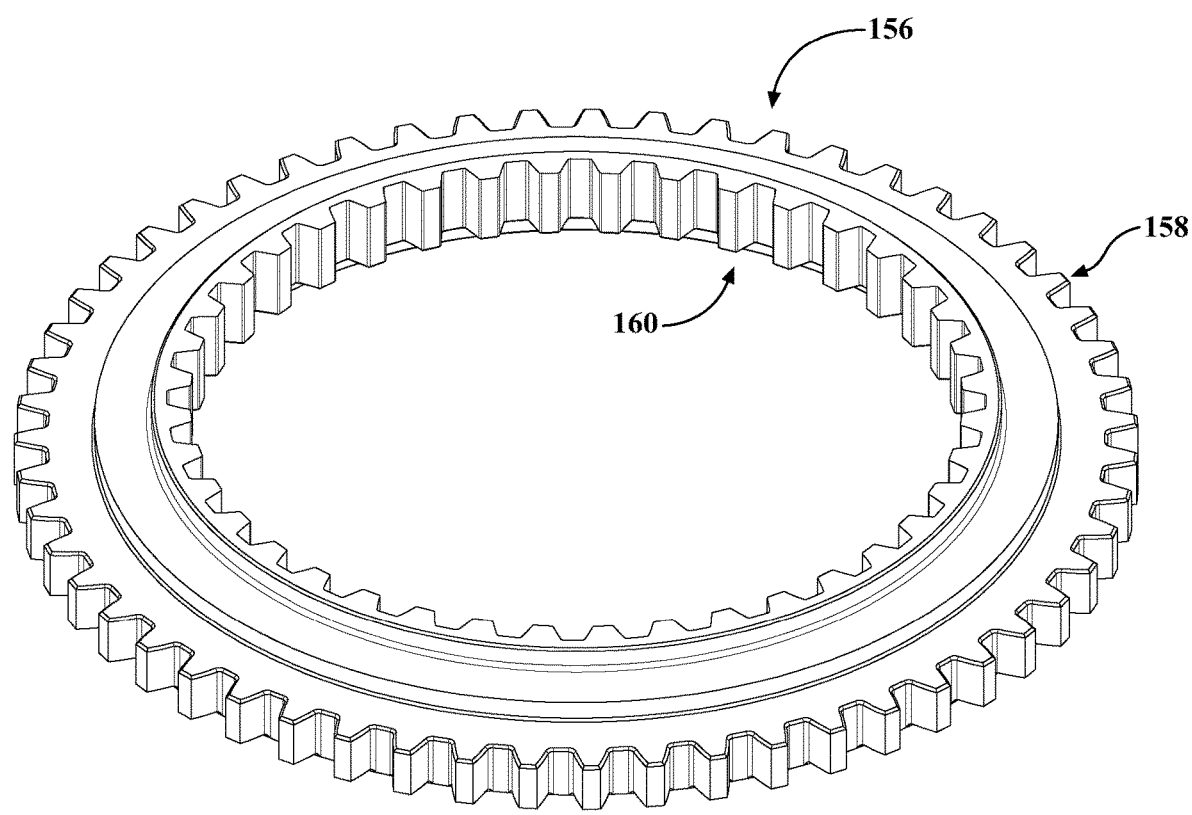
FIG. 23 is a side perspective view of an upper clutch dog plate of the modular clutch assembly of the second embodiment of the invention.

Referring now to FIGS. 14-23 a modular clutch assembly 100 according to a second embodiment of the invention is shown and described herein. The modular clutch assembly 100 includes a housing 102 (shown generically with respect to all embodiments in FIG. 27), which can be a single piece or multiple pieces. The housing 102 is connected to or is part of a housing of a vehicle transmission. The modular clutch assembly 100 includes an output hub 104 (partially shown in FIG. 14) extending into the modular clutch assembly 100 for selective rotation. The output hub 104 is the output of the modular clutch assembly 100, which ultimately provides power to an output device 113, which in the present embodiment of the invention is the transmission, whether it be through a direct connection, gear train or other configuration. In this particular embodiment of the invention, the output hub 104 has a plurality of internal radial teeth 106 and a plurality of outer radial teeth 108 both formed on a flange 110 extending from a side 112 of the output hub 104 as best shown in FIG. 19.

Rotatably extending into the modular clutch assembly 100 is an inner clutch race 114, which is one source of input power into the modular clutch assembly 100. The inner clutch race 114 can be connected to a first power source 121 (schematically shown) that can be in the form of an internal combustion engine, electric motor, or other suitable power source. The inner clutch race 114 has a plurality of face teeth 116 that rotate within the modular clutch assembly 100. The inner clutch race 114 also has splines 118 that are connected to rotatable shaft 119 that connects to the power source 121, however, this is optional and in some embodiments of the invention there can be a direct connection with the first power source 121.

Rotatably extending into the modular clutch assembly 100 is an upper clutch race 120, which is a second source of input power into the modular clutch assembly 100. The upper clutch race 120 is connected to a second power source 127 that can be an internal combustion engine, electric motor or other power source using the splines 29 formed on the outer diameter. The upper clutch race 120 also has a first set of a plurality of internal radial teeth 122. Also described below is a second set of a plurality of internal radial teeth 123 that are either formed as one piece with the upper clutch race 204 or as part of a press fit ring 125, shown in FIGS. 14, 16 and 17, the purposes of which is described below.

The modular clutch assembly 100 further includes an inner clutch 124 having an inner coil 126 capable of creating a magnetic field that causes movement of an armature 130. The inner coil 126 includes an inner coil winding 170 wound about a housing 128 and a cover 172 that together form a fixed part of the inner coil 126. The cover 172 has an inside surface and the housing 128 has an inner diameter surface 174 that define a passage 176 that the armature 130 slidably moves within upon energization and de-energization of the inner coil 170. The armature 130 has a non-magnetic portion 132 of the armature 130 that is supported at one end by a wall 177 on the cover 172 and at a second end by an extension 178 of the non-magnetic portion 134 of the armature 130 that contacts and slides on the inner diameter surface 174 of the housing 128. The nonmagnetic portion 134 is formed of non-magnetic stainless steel or other suitable material. While stainless steel is described, it is within the scope of the invention for other materials to be used. The armature 130 further includes a magnetic portion 132 that is moveably positioned within the passage 176 at a gap distance 173 from the inner diameter surface 174 of the housing 128. The gap distance 173 is provided by the extension 178 of the non-magnetic portion 134 of the armature 130 extending past an outer diameter surface 180 of the magnetic portion 134 of the armature 130. The cover 172 and the housing 128 also each have a stop 182a, 182b surface at each end of the passage 176 that prevents the armature 130 from sliding out of the passage 176. The non-magnetic portion 134 of the armature 130 is configured to contact an axial bearing 135, position between the end of the armature 130 and an inner clutch dog plate 136.

Figure 20:
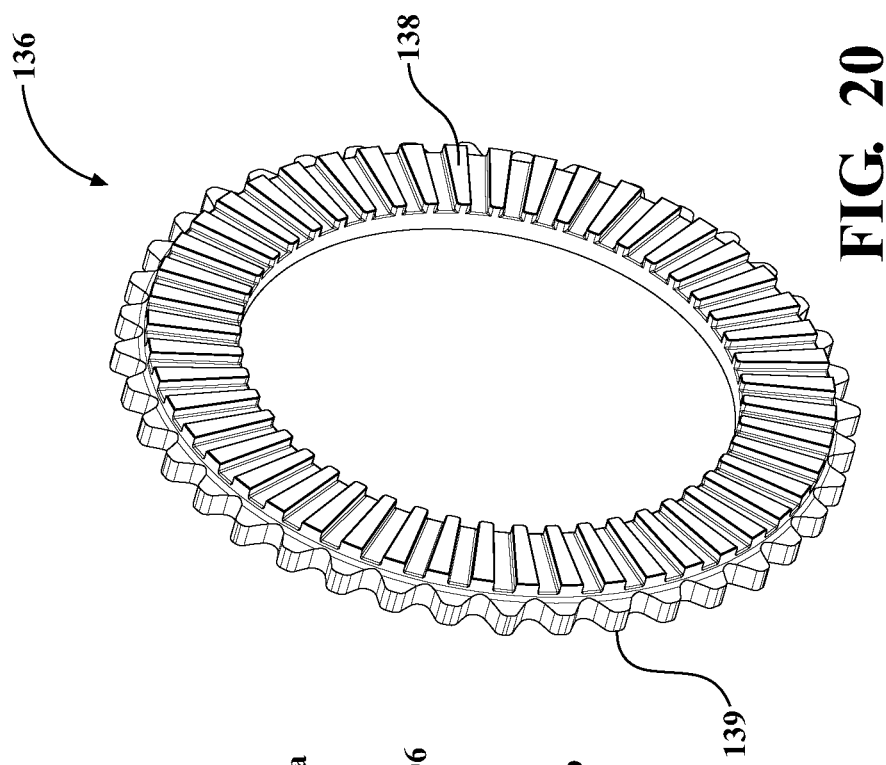
FIG. 20 is a side perspective view of an inner clutch dog plate of the modular clutch assembly of the second embodiment of the invention.

The inner clutch 124 further includes the inner clutch dog plate 136 rotatably positioned between the inner clutch race 114, the output hub 104 and the armature 130. In the present embodiment of the invention the inner clutch dog plate 136 on a first side has a radial bearing pocket 137 formed for receiving the axial bearing 135 that is positioned between the inner clutch dog plate 136 and the armature 130. The axial bearing 135 reduces the friction between the rotating inner clutch dog plate 136 and the armature 130, which is stationary. The armature 130 is non-rotatable and only moves axially, while the inner clutch dog plate 136 and axial bearing 135 are rotatable. During operation, the armature 130 directly contacts and pushes against the axial bearing 135, which in turn contacts and pushes against the inner clutch dog plate 136. Having a non-rotatable armature 130 allows for tighter clearance between the inner coil 126 and the armature 130, thereby reducing the overall size of the modular clutch assembly because of the reduced clearance as well as the reduced size of the inner coil 126. On a second side of the inner clutch dog plate 136, shown in FIG. 20, is a plurality of dog teeth 138 formed on the face of the inner clutch dog plate 136. The plurality of dog teeth 138 that are selectively engageable with the plurality of face teeth 116 on the inner clutch race 114. The inner clutch dog plate 136 also has a plurality of radial teeth 139 that are in mesh engagement with the plurality of internal diameter teeth 106 of the output hub 104.

During operation the armature 130 moves in a first direction (to the left in FIGS. 14 and 15) when the inner coil 126 is energized so that the armature 130 pushes on the axial bearing 135, which slides the inner clutch dog plate 136 axially to a position where the teeth 138 of the inner clutch dog plate 136 are engaged to the face teeth 116 of the inner clutch race 114. In this position the inner clutch dog plate 136 is engaged to both the inner clutch race 114 and the output hub 104 through the mesh engagement of radial teeth 139 of the lower clutch dog plate 136 with the internal diameter teeth 106 of the output hub 104; thereby engaging the inner clutch dog plate 136 to the inner clutch race 114 so there is power transfer from the rotatable shaft 119, through the inner clutch dog plate 136 to the output hub 104. Also, when energized the armature 130 pushes the axial bearing 135 and inner clutch dog plate 136 in the axial direction against the opposing force of spring 140 so that the spring 140 becomes compressed. Upon de-energization of the inner coil 126, the force of the spring 140 (which is actually multiple springs as discussed below) pushes against the inner clutch dog plate 136, axial bearing 135 and armature 130 to move these structures in a second direction (to the right shown in FIG. 15). When moved in the second direction the teeth 138 of the inner clutch dog plate 136 disengage the face teeth 116 of the inner clutch race 114, thereby disengaging the inner clutch dog plate 136 from the inner clutch race 114 so there is no power transfer from the rotatable shaft 119 to the output hub 104.

Figure 15:
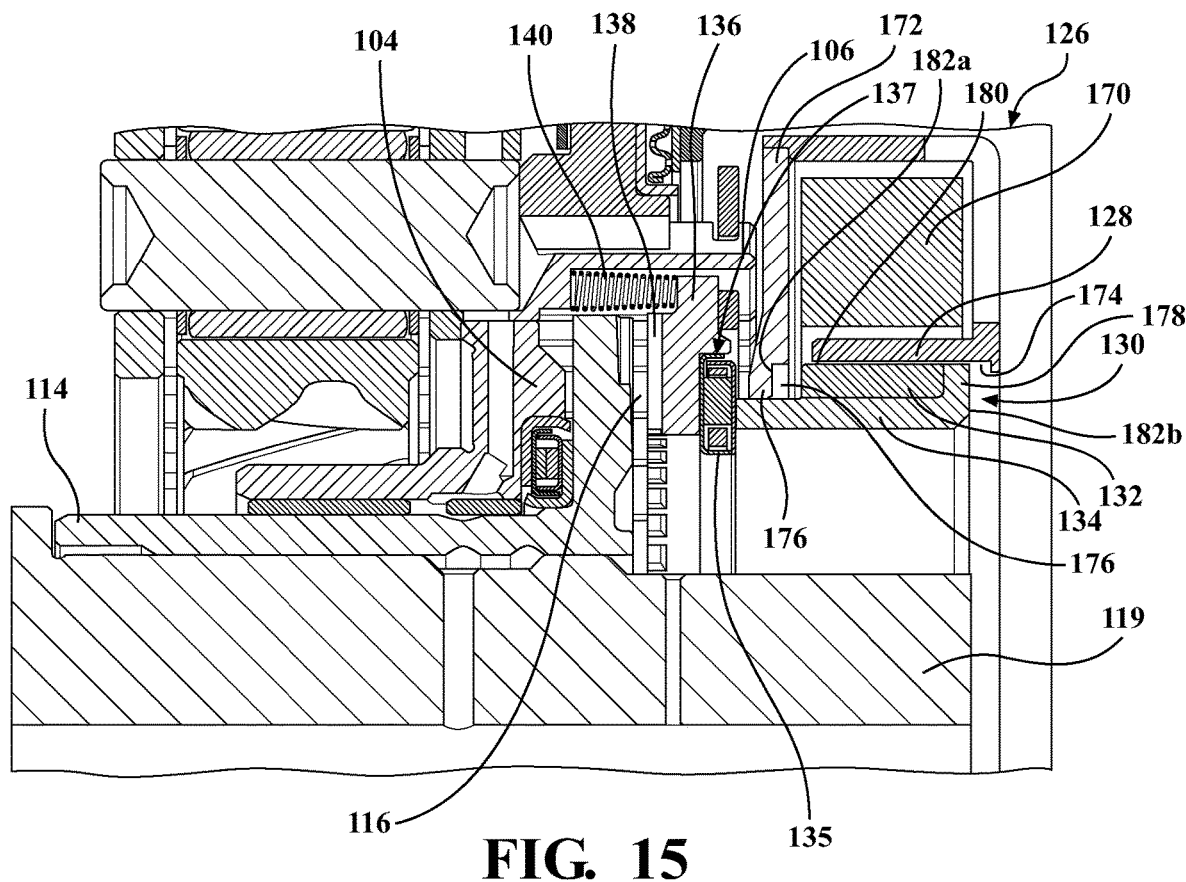
FIG. 15 is an enlarged partial plan side view of the inner clutch portion of the modular clutch assembly of the second embodiment of the invention.
Figure 18:
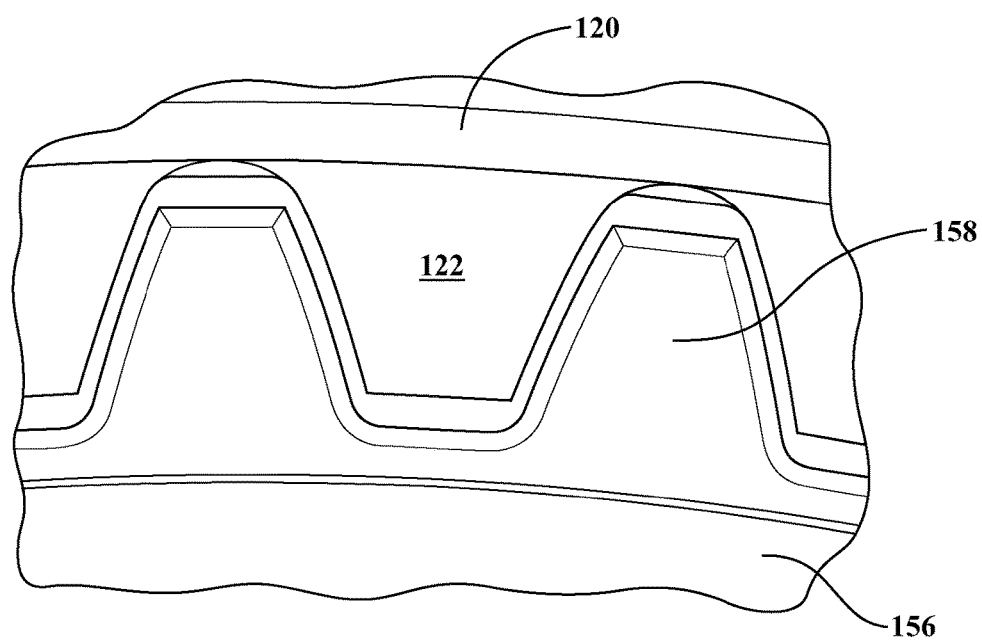
FIG. 18 is an enlarged partial view of the teeth of an upper clutch race engaged with the upper clutch dog plate of the modular clutch assembly of the second embodiment of the invention.
Figure 16:
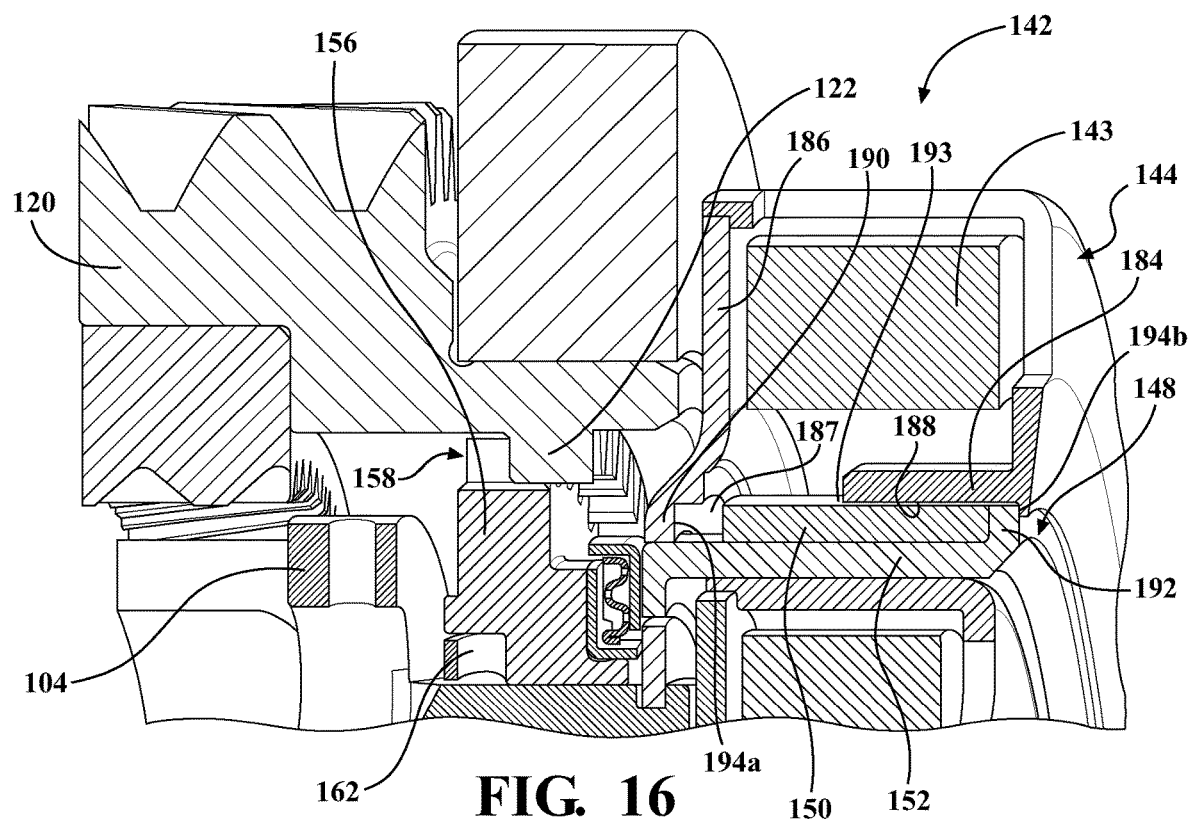
FIG. 16 is an enlarged partial plan side view of an engaged upper clutch portion of the modular clutch assembly of the second embodiment of the invention.
Figure 17:
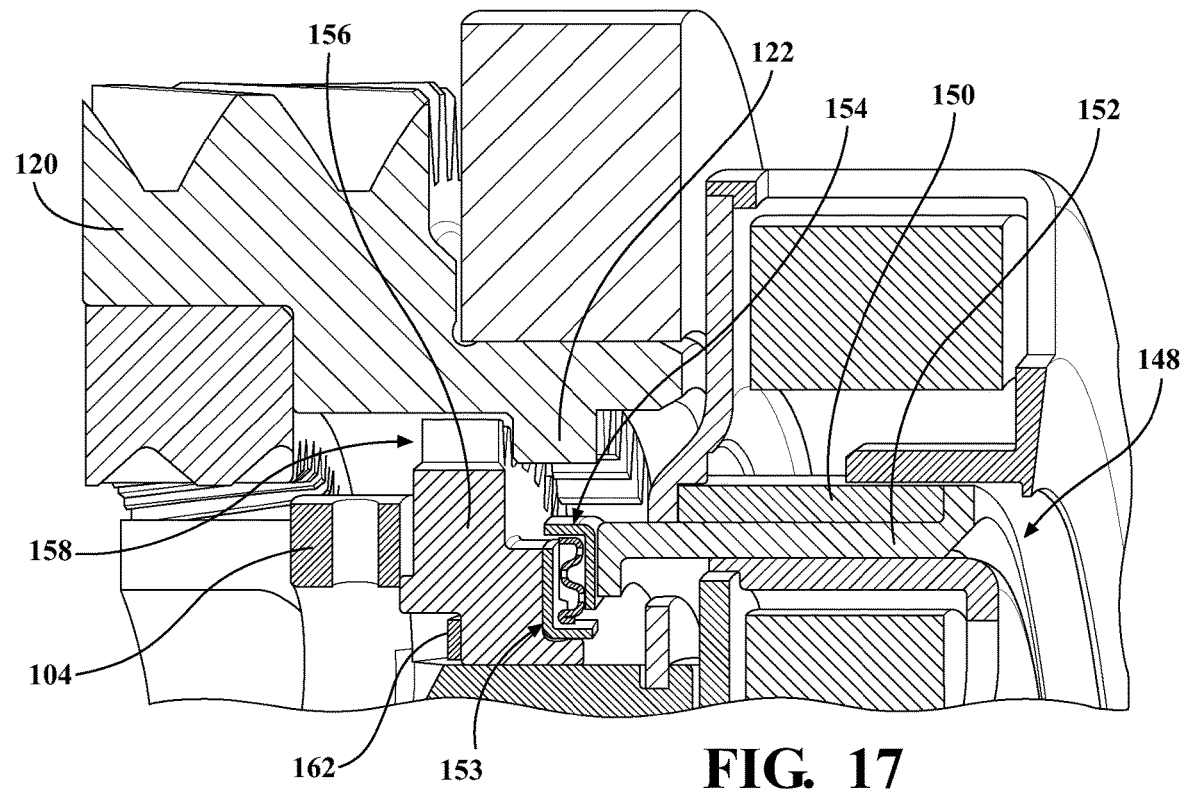
FIG. 17 is an enlarged partial plan side view of a disengaged upper clutch portion of the modular clutch assembly of the second embodiment of the invention.

With regard to the spring 140, shown in FIG. 15, when the inner coil 126 is de-energized and the inner clutch dog plate 136 is moved in the second direction the force of this movement is actually provided by two or more compression springs 140, 140a, 140b (only one shown in FIG. 15). Referring briefly to FIG. 19 two springs 140a, 140b are shown disposed in two pockets 141a, 141b located around the output hub 104. The output hub 104 has several other unlabeled pockets shown that are radially formed around the flange 110 each being able to hold an individual spring (not shown). There can be a greater or lesser number of springs and pockets depending on the side of the output hub 104 of the needs of a particular design.

Referring now to FIGS. 14, 16-18, 21, 23 and 28-29, the modular clutch assembly 100 further includes an upper clutch 142 having an upper coil 144 capable of creating a magnetic field that causes movement of an armature 148. The upper coil 144 includes an upper coil winding 143 wound about a housing 184 and a cover 186 that together form a fixed part of the upper coil 144. The cover 186 has an inside surface and the housing 184 has an inner diameter surface 188 that define a passage 187 that the armature 148 slidably moves within upon energization and de-energization of the upper coil 144. The armature 148 has a non-magnetic portion 152 of the armature 148 that is supported at one end by a wall 190 on the cover 186 and at a second end by an extension 192 of the non-magnetic portion 152 of the armature 148 that contacts and slides on the inner diameter surface 188 of the housing 184. The nonmagnetic portion 152 is formed of non-magnetic stainless steel or other suitable material. While stainless steel is described, it is within the scope of the invention for other materials to be used. The armature 148 further includes a magnetic portion 150 that is moveably positioned within the passage 187 at a gap distance 191 from the inner diameter surface 188 of the housing 184. The gap distance 191 is provided by the extension 192 of the non-magnetic portion 152 of the armature 148 extending past an outer diameter surface 193 of the magnetic portion 150 of the armature 148. The cover 186 and the housing 184 also each have a stop 194a, 194b surface at each end of the passage 187 that prevents the armature 148 from sliding out of the passage 187.

The non-magnetic portion 152 of the armature 148 is configured to contact an axial bearing 154, positioned between the end of the armature 148 and an upper clutch dog plate 156. The armature 148 is non-rotatable and only moves axially, while the upper clutch dog plate 156 and axial bearing 154 are rotatable. Having a non-rotatable armature 148 allows for tighter clearance between the upper coil 144 and the armature 148, thereby reducing the overall size of the modular clutch assembly because of the reduced clearance as well as the reduced size of the upper coil 144. In the present embodiment of the invention the upper clutch dog plate 156 on a first side has a radial bearing pocket 153 formed for receiving the axial bearing 154 that is positioned between the upper clutch dog plate 156 and the armature 148. The axial bearing 154 reduces the friction between the rotating upper clutch dog plate 156 and the armature 148, which is stationary. During operation, the armature 148 directly contacts and pushes against the axial bearing 154, which in turn contacts and pushes against the upper clutch dog plate 156. The armature 148 is formed of two materials including a magnetic material portion and a non-magnetic portion formed from non-magnetic stainless steel or other suitable non-magnetic material.

Referring to FIGS. 16, 17, 18 and 23, the upper clutch dog plate 156 has a plurality of dog teeth 158 positioned radially around the outer circumference of the upper clutch dog plate 156. The upper clutch dog plate 156 also has a plurality of inner radial teeth 160 positioned around an inner circumference of the upper clutch dog plate 156. The plurality of inner radial teeth 160 of the upper clutch dog plate 156 are in mesh engagement with the outer diameter teeth 108 of the output hub 104 and provide rotational power between the upper clutch dog plate 156, output hub 104 and upper clutch outer race 120.

During operation the armature 148 moves in a first direction (to the left shown in FIGS. 16 and 17) when the upper coil 144 is energized so that the armature 148 pushes on the axial bearing 154, which slides the upper clutch dog plate 156 axially to a position where the teeth 158 of the upper clutch dog plate 156 are no longer engaged to the internal radial teeth 122 of the upper clutch race 120, thereby disengaging the upper clutch dog plate 156 from the upper clutch race 120. In this position there is no power transfer from the upper clutch 142 to the output hub 104. Also, upon energization of the upper coil 144, the armature 148 pushes the axial bearing 154 and upper clutch dog plate 156 axially against the opposing force of a spring 162, positioned between the upper clutch dog plate 156 and the output hub 104, so that the spring 162 becomes compressed. Upon de-energization of the upper coil 144 the force of the spring 162 pushes against the upper clutch dog plate 156, axial bearing 154 and armature 148 to move these structures in a second direction (to the right shown in FIGS. 16 and 17), which engages the teeth 154 of the upper clutch dog plate 154 with the internal radial teeth 122 of the upper clutch race 120, thereby engaging the upper clutch dog plate 156 with the upper clutch race 120 so there is power transfer from the upper clutch race 120 to the output hub 104.

Figure 24:
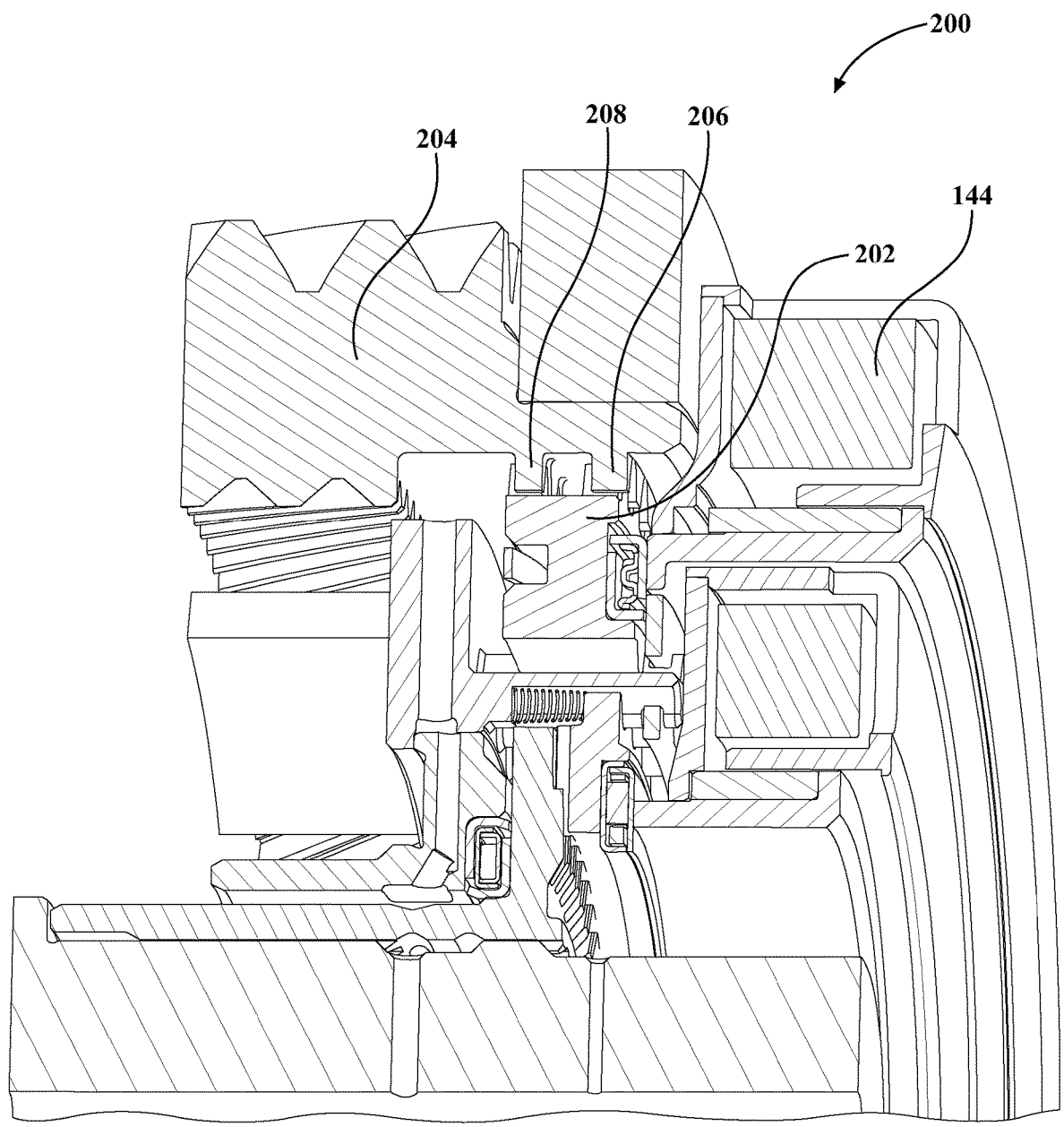
FIG. 24 is a partial side sectional perspective view of a modular clutch assembly according to a third embodiment of the invention that implements a face clutch and double tooth radial clutch in the engaged position.
Figure 25:
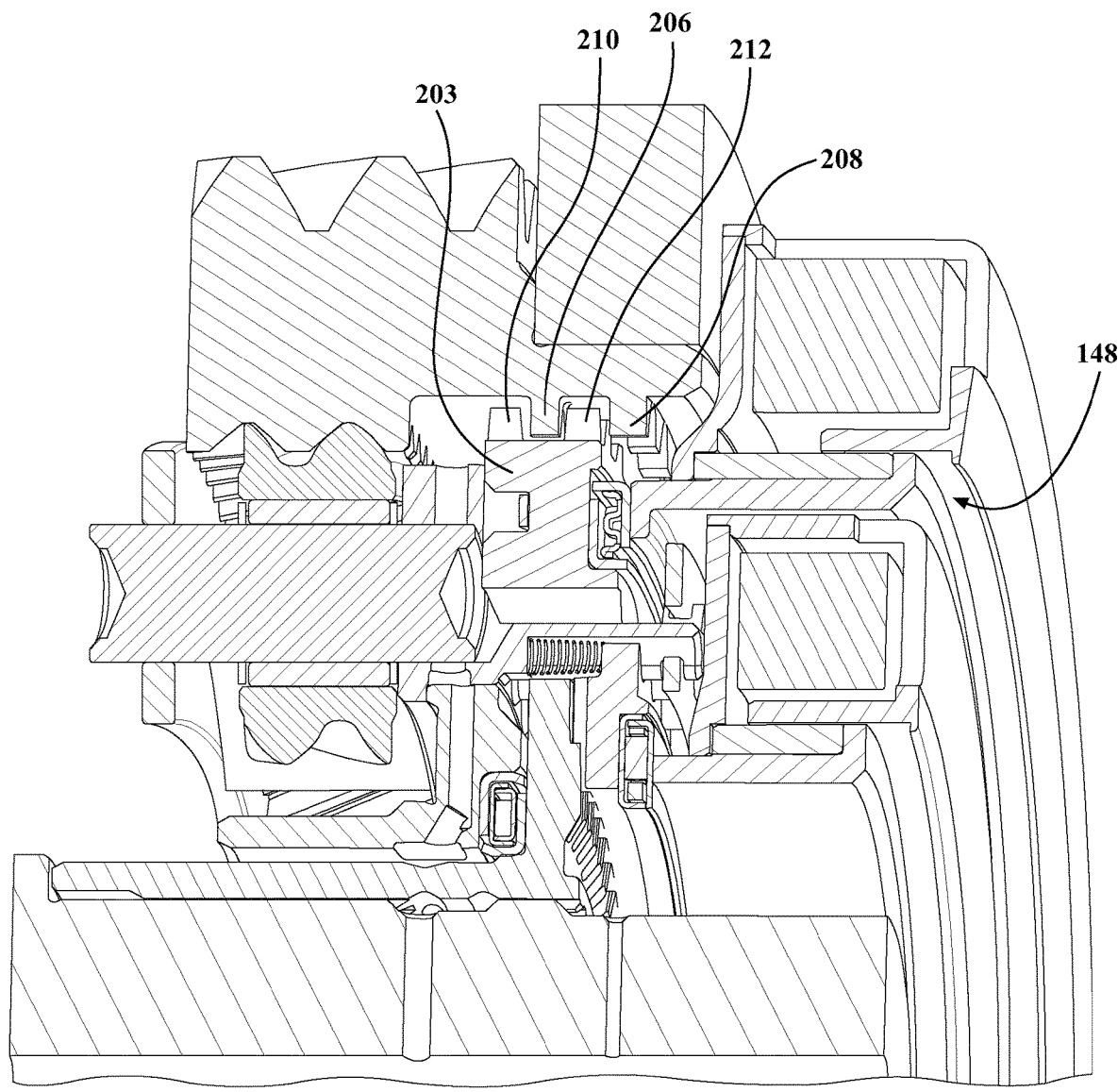
FIG. 25 is a partial side sectional perspective view of a modular clutch assembly according to a third embodiment of the invention that implements a face clutch and double tooth radial clutch in the disengaged position.
Figure 26:
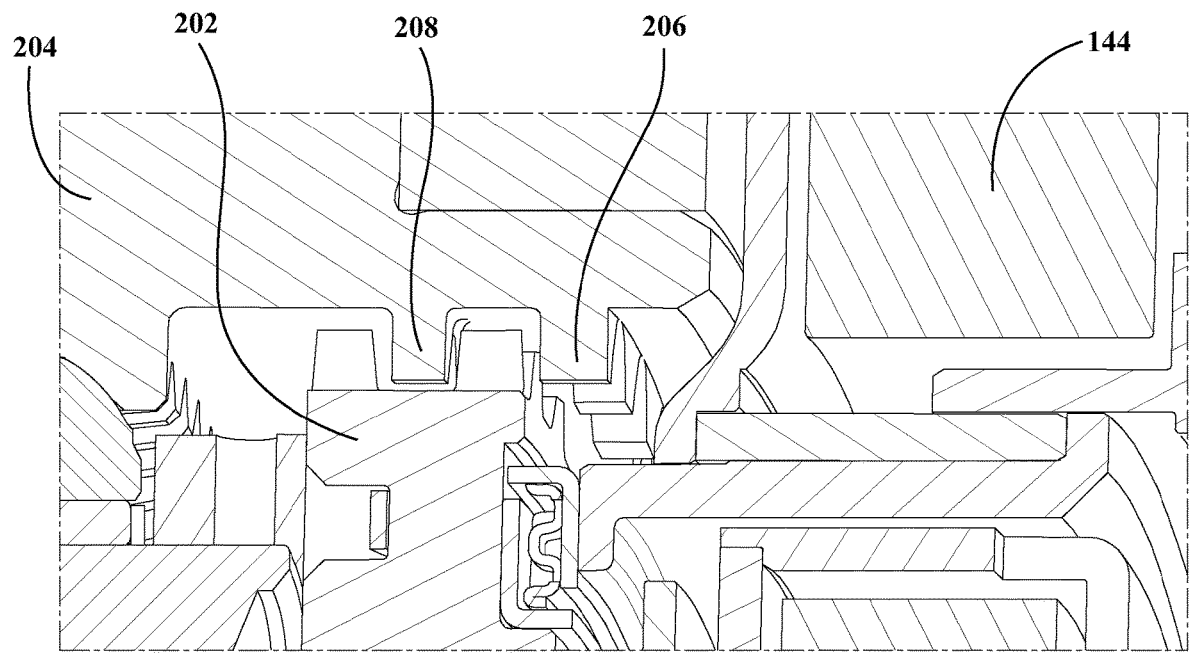
FIG. 26 is an enlarged partial side sectional plan view of the upper clutch dog plate being a double tooth radial clutch in the disengaged position.

Referring now to FIG. 24-26 a modular clutch assembly 200 according to a third embodiment of the invention is shown and described. The modular clutch assembly 200 has many of the same components as the modular clutch assembly 100, therefore applicant will not repeat all of the description and will use the same reference numbers from modular clutch assembly 100 where appropriate. The modular clutch assembly 200 includes a housing 202 (shown generically with respect to all embodiments in FIG. 27), which can be a single piece or multiple pieces. The housing 202 is connected to or is part of a housing of a vehicle transmission. The differences between modular clutch assembly 200 and modular clutch assembly 100 will now be described with reference numbers starting in the 200s.

Modular clutch assembly 200 has an upper clutch dog plate 202 and an upper clutch race 204 that provide enhanced torque transfer, while utilizing the same sized upper coil 144 used in the modular clutch assembly 100. The upper clutch race 204 has two rows of internal radial teeth 206, 208 axially spaced apart and circumscribing the upper clutch dog plate 202. The upper clutch dog plate 202 has two rows of dog teeth 210, 212 on the outer diameter of the upper clutch dog plate 202, which are axially spaced apart and configured to be engageable with the two rows of internal radial teeth 206, 208 of the upper clutch race 204. FIG. 25 shows that when upper coil 144 is energized the armature 148 and upper clutch dog plate moves to the left as shown in FIG. 25 and compresses the spring 162. When the upper coil 144 is de-energized the armature and upper clutch dog plate moves right as shown in FIG. 24 and the two rows of dog teeth 210, 212 engage the two rows of internal radial teeth 206, 208 of the upper clutch race 204. FIG. 24 shows the upper clutch dog plate 202 engaged with the upper clutch race 204 so that the two rows of dog teeth 210, 212 are completely in meshed engagement with the two rows of internal radial teeth 206, 208. In FIG. 25 the upper clutch dog plate 202 has been moved axially so that the two rows of dog teeth 210, 212 are no longer meshed with the two rows of radial teeth 206, 208 and the upper clutch dog plate 202 and upper clutch race 204 are free to rotate independently of each other. This tooth design provides increased torque capacity by sharing the load across two rows of teeth and not requiring a new coil design with increased armature travel which would be necessary if the width of the teeth were increased. Designing a coil with longer travel would result in a larger coil.

Referring back to FIG. 14, this embodiment describes the output device 113 is connected to the output hub 104, power source 121 is connected to inner clutch race 114 and power source 127 is connected to upper clutch race 120. It is within the scope of this invention for different types of connections to be used depending on a particular application. For example the output device 113 could also instead be connected to either the inner clutch race 114 or upper clutch race 120, while the power source 121 could also instead be connected to either the output hub 104 or the upper clutch race 120, and the power source 127 could also instead be connected to the output hub 104 or the inner clutch race 114. Such configurations would allow for different advantages to be achieved depending on a particular application. Therefore, the present application is not limited necessarily to the configuration described above since the modular clutch assembly 100 can be used in a variety of applications.

In addition to changing the connections between the output device 113, power source 121, and power source 127 it is also within the scope of this invention to use the inner clutch 124 and upper clutch 142 in a manner that they can change the power flow through the modular clutch assembly 100. For example, the inner clutch 124 and upper clutch 142 could simultaneously be engaged to transmit power from power source 127 or output device 113 to power source 121. In such an arrangement the upper clutch 142 and inner clutch 124 would both be engaged with the output hub 104, which would be receiving power either from the output device 113 or from the power source 127, through the inner clutch 124. This flow path of power for example could be used in systems where an internal combustion engine is the power source 121 with start/stop technology. The power source 127 would be an electric motor power source used to provide the initial "starting crank" to the internal combustion engine so it can start back up after stopping for a period of time.

It is also possible to engage both the inner clutch 124 and the upper clutch 142 to provide force from the power source 121 to the power source 127 in the opposite direction. In such an embodiment the power source 121 would be operating and supplying power to the modular clutch assembly 100, which could be used in applications where regeneration energy to the power source 127 is desired. An example of such a system would involve the power source 121 being a running internal combustion engine, where the extra energy not being transmitted to the output device 113 is then being passed along to the power source 127, which could be an electric motor using batteries that could benefit from regenerative power capture. In addition to both scenarios described above any extra power from the output hub 104 could also be passed along to either power source 121 or power source 127 for any suitable purpose. An example would be if output device is a transmission of a vehicle that is coasting, which is then creating energy at output hub 104 that could be recaptured and used by power source 121 or power source 127.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular clutch assembly comprising:
   an output hub extending into the modular clutch assembly for selective rotation, wherein the output hub is connected to an output device;
   an inner clutch race rotatably extending into the modular clutch assembly, the inner clutch race is connected to a first power source;
   an upper clutch race rotatably extending into the modular clutch assembly, the upper clutch race is connected to a second power source;
   an inner clutch selectively connected to the inner clutch race transmitting power from the first power source to the output device or the second power source, or for receiving and transferring power from the output device or the second power source to the first power source;
   an upper clutch selectively connected to the upper clutch race for transmitting power from the second power source to the output device or the first power source or for receiving and transferring power from the output device or the first power source to the second power source, the upper clutch circumscribes the inner clutch and includes:
      an upper coil positioned within the modular clutch assembly capable of creating a magnetic field;
      an armature with a magnetic portion positioned within the upper coil, the armature moves in the first direction when the upper coil is de-energized and the armature moves in the second direction when the upper coil is energized; and
      an upper clutch dog plate rotatably positioned between the upper clutch race, the output hub and the armature, when the upper coil is de-energized the armature and the upper clutch dog plate move in the first direction, thereby causing the upper clutch dog plate to engage both the upper clutch race and the output hub so that power can be between the upper clutch race and the output hub through the upper clutch dog plate.

2. The modular clutch assembly of claim 1 wherein the armature of the upper clutch includes a non-magnetic portion of the armature being supported at one end by a wall on a cover of the upper coil and at a second end by an extension of the non-magnetic portion that contacts and slides on an inner diameter surface of a housing of the upper coil.

3. The modular clutch assembly of claim 1 wherein an inner clutch further comprises:
   an inner coil positioned within the modular clutch assembly and capable of creating a magnetic field;
   an armature with a magnetic portion positioned within the inner coil, the armature moves in a first direction when the inner coil is energized, and the armature moves in a second direction when the inner coil is de-energized; and
   an inner clutch dog plate rotatably positioned between the inner clutch race, the output hub and the armature, the inner clutch dog plate is axially movable in the first direction when the armature transmits axial force to the inner clutch dog plate, thereby causing the inner clutch dog plate to engage both the inner clutch race and the output hub so that the power can be transferred between the inner clutch race and the output hub through the inner clutch dog plate.

4. The modular clutch assembly of claim 3 further comprising:
   wherein the armature of the inner clutch is non-rotatable; and
   an axial bearing positioned between the armature of the inner clutch and the inner clutch dog plate, wherein the armature presses directly against the axial bearing when the inner coil is energized, and the axial bearing is directly contactable with the inner clutch dog plate.

5. The modular clutch assembly of claim 3 further comprising:
   a plurality of inner clutch face lugs circumscribed by a plurality of upper clutch face lugs on the output hub;
   a first side and a second side of the inner clutch dog plate;
   a plurality of dog teeth formed on the second side of the inner clutch dog plate that are selectively engageable with a plurality of face teeth formed on the inner clutch race;
   a plurality of face lug teeth formed on the second side of the inner clutch dog plate that are selectively engageable with the plurality of inner clutch face lugs formed on the output hub;
   a first side and a second side of the upper clutch dog plate;
   a plurality of dog teeth formed on the second side of the upper clutch dog plate that are selectively engageable with a plurality of face teeth formed on the upper clutch race; and
   a plurality of face lug teeth formed on the second side of the upper clutch dog plate that are selectively engageable with the plurality of upper clutch face lugs formed on the output hub.

6. The modular clutch assembly of claim 5 further comprising:
   a radial bearing pocket formed on the first side of the inner clutch dog plate;
   an axial bearing positioned in the radial bearing pocket between the armature of the inner clutch and the inner clutch dog plate;
   wherein the armature of the inner clutch is non-rotatable and the armature presses directly against the axial bearing when the inner coil is energized, and the axial bearing is directly contactable with the inner clutch dog plate.

7. The modular clutch assembly of claim 6 further comprising:
   a clip groove formed on the first side of the upper clutch dog plate; and
   a snap ring positioned in the clip groove at one end and connected to the armature of the upper clutch at a second end, wherein movement of the armature pushes and pulls the upper clutch dog plate by way of the snap ring connection with the clip groove.

8. The modular clutch assembly of claim 5 further comprising:
   a clip groove formed on the first side of the upper clutch dog plate; and
   a snap ring positioned in the clip groove at one end and connected to the armature of the upper clutch at a second end, wherein movement of the armature pushes and pulls the upper clutch dog plate by way of the snap ring connection with the clip groove.

9. The modular clutch assembly of claim 3 wherein the armature of the inner clutch includes a non-magnetic portion of the armature being supported at one end by a wall on a cover of the inner coil and at a second end by an extension of the non-magnetic portion that contacts and slides on an inner diameter surface of a housing of the upper coil.

10. The modular clutch assembly of claim 1 wherein upon energization of the upper coil the armature of the upper clutch moves in the second direction and pulls the upper clutch dog plate with the armature to disengage the upper clutch dog plate from the output hub.

11. The modular clutch assembly of claim 1 further comprising at least one spring between the upper clutch dog plate and the output hub that biases the upper clutch dog plate into contact with the output hub when the upper coil is de-energized.

12. A modular clutch assembly comprising:
  an output hub connected to an output device, the output hub extends into the modular clutch assembly for selective rotation, wherein the output hub has a plurality of internal radial teeth and a plurality of outer radial teeth;
  an inner clutch race connected to a first power source, the inner clutch race is rotatably extends into the modular clutch assembly and having a plurality of face teeth;
  an upper clutch race connected to a second power source, the upper clutch race rotatably extends into the modular clutch assembly and having a plurality of internal radial teeth;
  an inner clutch selectively connected to the plurality of face teeth of the inner clutch race for transmitting power from the first power source to the output device or the second power source, or for receiving and transferring power from the output device or the second power source to the first power source;
  an upper clutch selectively connected to the upper clutch race for transmitting power from the second power source to the output device or the first power source, or for receiving and transferring power from the output device or the first power source to the second power source, the upper clutch circumscribes the inner clutch and includes:
    an upper coil positioned within the modular clutch assembly and capable of creating a magnetic field;
    an armature with a magnetic portion positioned within the upper coil, the armature moves in a first direction when the upper coil is energized, and the armature moves in a second direction when the upper coil is de-energized; and
    an upper clutch dog plate rotatably positioned between the upper clutch race, the output hub and the armature, wherein the upper clutch dog plate has a plurality of dog teeth positioned radially around the outer circumference of the upper clutch dog plate and a plurality of inner radial teeth positioned around an inner circumference of the upper clutch dog plate that are in mesh engagement with the plurality of outer radial teeth of the output hub, the upper clutch dog plate is axially movable in the first direction when the armature transmits axial force to the upper clutch dog plate, thereby causing the upper clutch dog plate to move axially and engage the plurality of dog teeth radially positioned around the outer circumference of the upper clutch dog plate with the plurality of internal radial teeth of the upper clutch race so that power can be transmitted between the upper clutch race and the output hub through the upper clutch dog plate.

13. The modular clutch assembly of claim 12 wherein the armature of the upper clutch includes a non-magnetic portion of the armature being supported at one end by a wall on a cover of the upper coil and at a second end by an extension of the non-magnetic portion that contacts and slides on an inner diameter surface of a housing of the upper coil.

14. The modular clutch assembly of claim 12 further comprising:
  two rows of axially spaced apart internal radial teeth formed on the upper clutch race and circumscribing the upper clutch dog plate;
  two rows of dog teeth formed on the outer diameter of the upper clutch dog plate, which are axially spaced apart and configured to be engageable with the two rows of internal radial teeth of the upper clutch race when the upper clutch dog plate is moved in the first direction and the two rows of dog teeth disengage the two twos of axially spaced apart radial teeth when the upper clutch dog plate moves in the second direction.

15. The modular clutch assembly of claim 12 wherein the inner clutch further comprises:
  an inner coil positioned within the modular clutch assembly capable of creating a magnetic field;
  an armature with a magnetic portion positioned within the inner coil, the armature moves in a first direction when the inner coil is energized, and the armature moves in a second direction when the inner coil is de-energized;
  an inner clutch dog plate rotatably positioned between the inner clutch race, the output hub and the armature, the inner clutch dog plate has a plurality of dog teeth and a plurality of radial teeth that are in mesh engagement with the plurality of internal diameter teeth of the output hub, the inner clutch dog plate is axially movable in the first direction when the armature transmits axial force on the inner clutch dog plate, thereby causing the plurality of dog teeth of the inner clutch doc plate engage the plurality of face teeth of the inner clutch race so that the power can be transferred between the inner clutch race and the output hub through the inner clutch dog plate.

16. The modular clutch assembly of claim 15 further comprising:
  wherein the armature of the inner clutch is non-rotatable; and
  an axial bearing positioned between the armature of the inner clutch and the inner clutch dog plate, wherein the armature presses directly against the axial bearing when the inner coil is energized, and the axial bearing is directly contactable with the inner clutch dog plate.

17. The modular clutch assembly of claim 15 further comprising a least one spring between the inner clutch dog plate and the output hub, wherein the at least one spring becomes compressed the armature of the inner clutch presses directly against the axial bearing when the inner coil is energized and upon de-energization of the inner coil the force of the spring pushes the inner clutch dog plate and the armature of the inner clutch so that the plurality of dog teeth of the inner clutch dog plate disengage the plurality of face teeth of the inner clutch race.

18. The modular clutch assembly of claim 15 further comprising:
  a radial bearing pocket formed on the first side of the inner clutch dog plate;
  an axial bearing positioned in the radial bearing pocket between the armature of the inner clutch and the inner clutch dog plate;
  wherein the armature of the inner clutch is non-rotatable and the armature presses directly against the axial bearing when the inner coil is energized, and the axial bearing is directly contactable with the inner clutch dog plate.

19. The modular clutch assembly of claim 15 wherein the armature of the inner clutch includes a non-magnetic portion of the armature being supported at one end by a wall on a cover of the inner coil and at a second end by an extension of the non-magnetic portion that contacts and slides on an inner diameter surface of a housing of the inner coil.

20. The modular clutch assembly of claim 12 further comprising a least one spring between the upper clutch dog plate and the output hub, wherein the at least one spring becomes compressed the armature of the upper clutch presses directly against the axial bearing when the upper coil is energized and upon de-energization of the upper coil the force of the spring pushes the upper clutch dog plate and the armature of the upper clutch so that the plurality of dog teeth of the upper clutch dog plate disengage the plurality of face teeth of the upper clutch race.

21. The modular clutch assembly of claim 12 further comprising:
   a radial bearing pocket formed on the first side of the upper clutch dog plate;
   an axial bearing positioned in the radial bearing pocket between the armature of the upper clutch and the upper clutch dog plate;
   wherein the armature of the upper clutch is non-rotatable and the armature presses directly against the axial bearing when the upper coil is energized, and the axial bearing is directly contactable with the upper clutch dog plate.

22. A modular clutch assembly comprising:
   an output hub connected to an output device, the output hub extends into the modular clutch assembly for selective rotation, wherein the output hub has a plurality of internal radial teeth and a plurality of outer radial teeth;
   an inner clutch race connected to a first power source, the inner clutch race is rotatably extends into the modular clutch assembly and having a plurality of face teeth;
   an upper clutch race connected to a second power source, the upper clutch race rotatably extends into the modular clutch assembly and having a plurality of internal radial teeth;
   an inner clutch selectively connected to the inner clutch race transmitting power from the first power source to the output device or the second power source, or for receiving and transferring power from the output device or the second power source to the first power source the inner clutch includes:
      an inner coil positioned within the modular clutch assembly and capable of creating a magnetic field;
      an armature with a magnetic portion positioned within the inner coil, the armature moves in a first direction when the inner coil is energized, and the armature moves in a second direction when the inner coil is de-energized;
      an inner clutch dog plate rotatably positioned between the inner clutch race, the output hub and the armature, the inner clutch dog plate has a plurality of dog teeth and a plurality of radial teeth that are engaged with the plurality of internal diameter teeth of the output hub;
      an axial bearing positioned between the armature of the inner clutch and the inner clutch dog plate, wherein the armature presses directly against the axial bearing when the inner coil is energized and the axial bearing is directly contactable with the inner clutch dog plate causing the plurality of dog teeth to engage the plurality of face teeth of the inner clutch race so that the power can be transferred between the inner clutch dog plate and the output hub;
   an upper clutch selectively connected to the upper clutch race for transmitting power from the second power source to the output device or the first power source, or for receiving and transferring power from the output device or the first power source to the second power source, the upper clutch circumscribes the inner clutch and includes:
      an upper coil positioned within the modular clutch assembly and capable of creating a magnetic field;
      an armature with a magnetic portion positioned within the upper coil, the armature moves in a first direction when the upper coil is energized, and the armature moves in a second direction when the upper coil is de-energized;
      an upper clutch dog plate rotatably positioned between the upper clutch race, the output hub and the armature, wherein the upper clutch dog plate has a plurality of dog teeth positioned radially around the outer circumference of the upper clutch dog plate and a plurality of inner radial teeth positioned around an inner circumference of the upper clutch dog plate, the plurality of inner radial teeth are engaged with the outer diameter teeth of the output hub;
      an axial bearing positioned between the armature of the upper clutch and the upper clutch dog plate, wherein the armature presses directly against the axial bearing when the upper coil is energized and the axial bearing is directly contactable with the upper clutch dog plate causing the upper clutch dog plate to move axially in the first direction when the armature transmits axial force to the upper clutch dog plate, thereby causing the upper clutch dog plate to move axially and engage the plurality of dog teeth with the internal radial teeth of the upper clutch race so that power can be between the upper clutch race and the output hub through the upper clutch dog plate.

23. The modular clutch assembly of claim 22 further comprising:
   two rows of axially spaced apart internal radial teeth formed on the upper clutch race and circumscribing the upper clutch dog plate;
   two rows of dog teeth formed on the outer diameter of the upper clutch dog plate, which are axially spaced apart and configured to be engageable with the two rows of internal radial teeth of the upper clutch race when the upper clutch dog plate is moved in the first direction and the two rows of dog teeth disengage the two twos of axially spaced apart radial teeth when the upper clutch dog plate moves in the second direction.

24. The modular clutch assembly of claim 22 further comprising a least one spring between the upper clutch dog plate and the output hub, wherein the at least one spring becomes compressed the armature of the upper clutch presses directly against the axial bearing when the upper coil is energized and upon de-energization of the upper coil the force of the spring pushes the upper clutch dog plate and the armature of the upper clutch so that the plurality of dog teeth of the upper clutch dog plate disengage the plurality of face teeth of the upper clutch race.

25. The modular clutch assembly of claim 22 further comprising:
   a radial bearing pocket formed on the first side of the upper clutch dog plate where the axial bearing is positioned in the radial bearing pocket between the armature of the upper clutch and the upper clutch dog plate;

wherein the armature of the upper clutch is non-rotatable and the armature presses directly against the axial bearing when the upper coil is energized, and the axial bearing is directly contactable with the upper clutch dog plate.

26. The modular clutch assembly of claim 22 further comprising:

a radial bearing pocket formed on the first side of the inner clutch dog plate, where the axial bearing of the inner clutch is positioned in the radial bearing pocket between the armature of the inner clutch and the inner clutch dog plate;

wherein the armature of the inner clutch is non-rotatable, and the armature presses directly against the axial bearing when the inner coil is energized, and the axial bearing is directly contactable with the inner clutch dog plate.

27. The modular clutch assembly of claim 22 further comprising a least one spring between the inner clutch dog plate and the output hub, wherein the at least one spring becomes compressed the armature of the inner clutch presses directly against the axial bearing when the inner coil is energized and upon de-energization of the inner coil the force of the spring pushes the inner clutch dog plate and the armature of the inner clutch so that the plurality of dog teeth of the inner clutch dog plate disengage the plurality of face teeth of the inner clutch race.

28. The modular clutch assembly of claim 22 further comprising:

wherein the armature of the upper clutch includes a non-magnetic portion of the armature being supported at one end by a wall on a cover of the upper coil and at a second end by an extension of the non-magnetic portion that contacts and slides on an inner diameter surface of a housing of the upper coil, and wherein the armature of the inner clutch includes a non-magnetic portion of the armature being supported at one end by a wall on a cover of the inner coil and at a second end by an extension of the non-magnetic portion that contacts and slides on an inner diameter surface of a housing of the inner coil.

29. The modular clutch assembly of claim 22 further comprising:

a radial bearing pocket formed on the first side of the inner clutch dog plate, where the axial bearing of the inner clutch is positioned in the radial bearing pocket between the armature of the inner clutch and the inner clutch dog plate;

wherein the armature of the inner clutch is non-rotatable, and the armature presses directly against the axial bearing when the inner coil is energized, and the axial bearing is directly contactable with the inner clutch dog plate.

* * * * *